US012631295B2

(12) United States Patent
Rasolofondraibe et al.

(10) Patent No.: US 12,631,295 B2
(45) Date of Patent: May 19, 2026

(54) METHOD FOR DETECTING A CHANGE IN THE ENVIRONMENT OF A CABLE

(71) Applicants: UNIVERSITÉ DE REIMS CHAMPAGNE—ARDENNE, Reims (FR); CETIM, Senlis (FR)

(72) Inventors: Lanto Rasolofondraibe, Reims (FR); Bernard Pottier, Reims (FR); Sylvain Acoulon, Montdidier (FR)

(73) Assignees: UNIVERSITÉ DE REIMS CHAMPAGNE-ARDENNE, Reims (FR); CETIM, Senlis (FR)

( * ) Notice: Subject to any disclaimer, the term of this patent is extended or adjusted under 35 U.S.C. 154(b) by 551 days.

(21) Appl. No.: 17/799,429

(22) PCT Filed: Feb. 12, 2021

(86) PCT No.: PCT/EP2021/053550

§ 371 (c)(1),
(2) Date: Aug. 12, 2022

(87) PCT Pub. No.: WO2021/160858

PCT Pub. Date: Aug. 19, 2021

(65) Prior Publication Data

US 2023/0339125 A1 Oct. 26, 2023

(30) Foreign Application Priority Data

Feb. 13, 2020 (FR) ..................................... 2001454

(51) Int. Cl.
*F16P 3/14* (2006.01)
*D07B 1/14* (2006.01)
*G08B 13/26* (2006.01)

(52) U.S. Cl.
CPC ................ *F16P 3/148* (2013.01); *D07B 1/14* (2013.01); *G08B 13/26* (2013.01)

(58) Field of Classification Search
CPC ............. F16P 3/148; D07B 1/14; G08B 13/26
See application file for complete search history.

(56) References Cited

FOREIGN PATENT DOCUMENTS

| | | | | |
|---|---|---|---|---|
| CN | 101913417 A | * | 12/2010 | ............... B63C 7/20 |
| EP | 0239807 | * | 10/1987 | ............ G08B 13/26 |
| EP | 0239807 A1 | | 10/1987 | |
| EP | 2207924 | * | 7/2003 | |
| EP | 2207924 A2 | | 7/2010 | |
| JP | S5597688 | * | 7/1980 | |
| JP | S5597688 A | | 7/1980 | |
| JP | SS5597688 | * | 7/1980 | ............ G08B 13/26 |
| WO | 2009049616 A2 | | 4/2009 | |

OTHER PUBLICATIONS

International Search Report corresponding to International Application No. PCT/EP2021/053550, dated Apr. 8, 2021, 5 pages.

* cited by examiner

*Primary Examiner* — Mancil Littlejohn, Jr.
(74) *Attorney, Agent, or Firm* — Ronald M. Kachmarik; Cooper Legal Group LLC

(57) ABSTRACT

Method for detecting a change in the environment near at least one portion of a hoisting, traction or boundary cable which conducts electricity. The change in the environment is linked to the relative movement of at least one person, animal or object with respect to the portion. The method includes the step of detecting a variation in the capacitance of the portion. The variation is representative of the movement.

14 Claims, 15 Drawing Sheets

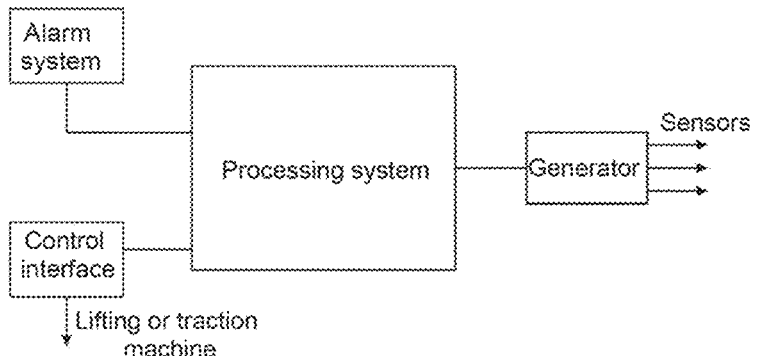
Fig. 13
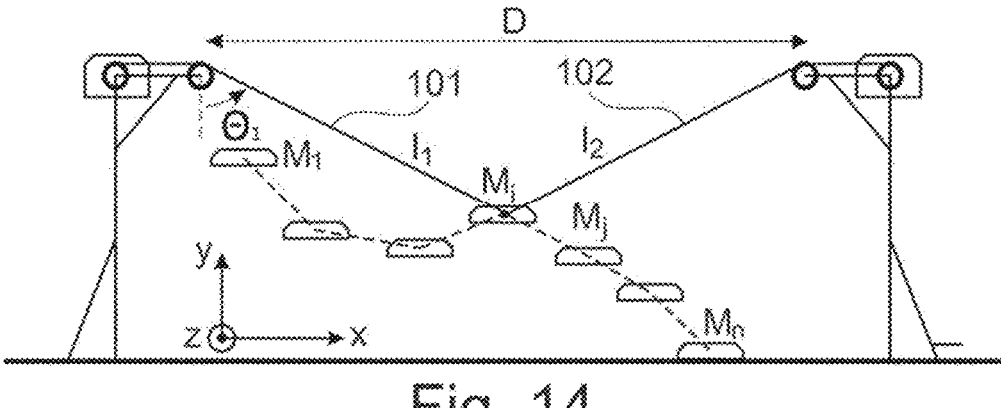
Fig. 14
| $M_i$ | $C_1$ | ... | $C_j$ | ... | $C_p$ |
|---|---|---|---|---|---|
| $M_1$ | $\Delta V_{S,1}(M_1-M_0)$ | ... | $\Delta V_{S,j}(M_1-M_0)$ | ... | $\Delta V_{S,p}(M_1-M_0)$ |
| | ... | ... | ... | ... | ... |
| | ... | ... | ... | ... | ... |
| $M_i$ | $\Delta V_{S,1}(M_i-M_{i-1})$ | ... | $\Delta V_{S,j}(M_i-M_{i-1})$ | ... | $\Delta V_{S,p}(M_i-M_{i-1})$ |
| | ... | ... | ... | ... | ... |
| | ... | ... | ... | ... | ... |
| $M_n$ | $\Delta V_{S,1}(M_n-M_{n-1})$ | ... | $\Delta V_{S,j}(M_n-M_{n-1})$ | ... | $\Delta V_{S,p}(M_n-M_{n-1})$ |
Fig. 15

METHOD FOR DETECTING A CHANGE IN THE ENVIRONMENT OF A CABLE

TECHNICAL FIELD

The present invention concerns a method for detecting a change in the environment of a traction, lifting or boundary cable linked to the proximity of an individual, animal or object to that cable, and a device for executing that method.

PRIOR ART

Cable-driven parallel robots have a promising future in industry. In fact, they enable the lifting and the manipulation of loads or working tools that can be heavy and/or bulky. These robots are parallel mechanisms composed of at least two cables connected to a base and to a cradle or an effector. The lifting or traction cables of cable-driven parallel robots can reach lengths greater than ten meters. The proximity of an obstacle, in particular a human, with one of these traction or lifting cables represents a real danger. It is necessary to ensure safety around these robots.

In industry, to prevent any collision or accident between a human and a robot, access to the working zones of the robots is prohibited. Now cable-driven parallel robots can occupy large areas, leading to a loss of usable space. Moreover, any intervention in an operating zone of a robot when it is active necessitates stopping and therefore leads to a slowing down of activity.

Similar problems can be encountered with other lifting structures including cables, such as cranes. Safety is ensured via safety rules and training. The human parameter is then important and inattention can have serious consequences.

Moreover, the structure of these cables makes them difficult to detect by visual detection means. In fact, the cables being long and of relatively small diameter compared to their length, their detection by image analysis is relatively ineffective.

It is also useful to be able to ensure the safety of a zone delimited by a cable, for example a retractable safety barrier, in order to prevent any intrusion into that zone.

STATEMENT OF INVENTION

Consequently, there exists a need to benefit from a method that is easy to use in various systems and enables a zone in the proximity of a lifting or traction cable of a cable-driven parallel robot or other type of lifting or traction machine such as a crane to be made safe, with the aim of preventing any collision. There is also a benefit in detecting a risk of intrusion into a zone delimited by at least one cable.

SUMMARY OF THE INVENTION

The invention aims to respond to some or all of these requirements and achieves this, in one of its aspects, thanks to a method for detecting a change in the environment in the vicinity of at least a portion of an electrically conductive lifting, traction or boundary cable, this change in the environment being linked to the relative movement of at least one individual, animal or object relative to said portion, the method including the step consisting in detecting a variation of the capacitance of said portion representative of said movement.

The cable may in particular be a lifting or traction cable of a cable-driven parallel robot or other type of lifting or traction machine such as a crane, the change in the environment being linked to the coming into the proximity of said portion of the individual, animal or object, leading to a risk of collision with the latter and thus forming a potential obstacle.

The invention enables automatic detection of the presence of an obstacle in the proximity of a cable based on observation of variations of the capacitance of said cable portion.

An advantage of the invention is that it makes it possible to disregard external disturbances, in particular linked to the ambient relative humidity, without necessarily effecting regular calibration, thus enhancing the reliability of detection.

The electrically-conductive cable portion is subjected to a predefined variable potential and emits a radial electric field around it. An intrusion causes a variation of that electric field that may be reflected in a variation of the self-capacitance of the electrically-conductive cable portion.

The capacitance can advantageously be reflected in a voltage proportional to the capacitance: $V=K \times C$. Analysis of the variation of this voltage by electronic means enables detection of the presence of an obstacle in the proximity of the electrically-conductive cable portion, and even identification of the obstacle and/or determination its distance.

One of the advantages of the method according to the invention is that it enables safe exploitation of the zone in which the cable is moving, without physically prohibiting access to that zone by individuals. This means for example the operating zone of a cable-driven parallel robot or the zone situated in the proximity of a crane.

If the cable is a boundary cable, the change in the environment is linked to the coming into the proximity of said portion of an individual, animal or object, leading to a risk of intrusion. The invention then enables a zone delimited by at least one boundary cable which may be of great length and surveillance of which may be difficult to be made safe. The cable may define the zone, for example surround it or be present in a passage giving access to the zone.

Guard Screens

In accordance with one embodiment the cable extends at least partially around a guide, drive and/or winding system. This guide, drive and/or winding system may include at least one pulley and/or at least one winder and/or at least one support structure, for example a jib crane.

The guide, winding and/or drive system may be subject to the electrical influence of the mechanical elements constituting the system. This electrical influence creates capacitive coupling liable to disturb the capacitive detection of said movement. A screen at the potential of the cable may extend at least partially around one or more of these mechanical elements, in particular extend at least partially around the cable guide, drive and/or winding system.

Thus the cable advantageously extends over at least a portion of its length facing a screen raised to said predefined potential, in particular via a voltage follower.

This screen raised to the potential of the cable enables reduction or even elimination of the capacitive coupling of the cable with the elements composing the guide, driving and/or winding system. In the absence of a screen raised to the potential of the cable the capacitive coupling is much higher than the self-capacitance of the cable. The disadvantage of the absence of the screen is that the ratio $C_{obstacle}/C_{cable}$ is much lower than in the presence of the screen, thus reducing the sensitivity of the capacitive detection.

The capacitance of this cable part situated facing the screen raised to the predefined potential is advantageously always the same, preferably zero, for a given length l' of cable.

The screen may also be surrounded at least partially by a grounded shield. The part of the cable facing the screen and the shield is then isolated from external electrical influence.

The guide, drive and/or winding system can be electrically insulated from the cable, in particular by being covered with an electrically-insulative material.

The cable may be unwound from a winding and/or drive system, and the detection of the variation of the capacitance of said at least one conductive portion can be effected with compensation of the variation of the load induced by a modification of the unwound length l of cable. This unwound length l of cable may in particular be defined at any time by means of an angular coder, for example.

The wound part of the cable can be insulated by means of a screen raised to the predefined potential of the cable and/or a grounded shield.

Thus, in one embodiment of the invention, the acquisition both of a quantity representing the capacitance variation of said cable portion and a quantity representative of movement, in particular winding or unwinding, of the cable can enable determination whether the variation of the capacitance is due mainly to a movement of the cable and/or to the presence in the proximity of the cable of an individual, animal or object liable to constitute an obstacle, for example.

Element Under Traction

The electrically-conductive cable portion may be electrically influenced by other external elements.

The cable may for example be attached to an element. The latter may be a fixing system and/or a load and/or a working tool and/or a cradle, or any other element that can be fixed to the cable. The portion of the cable in contact with this element may then suffer electrical influence from said element.

To limit such influences, if this is required, the electrically-conductive cable portion may extend over a length less than that of the cable; the distal part of the cable preferably does not emit an electric field. Thus, the element not being fixed to an electrically-conductive portion, no electrical influence disturbs the capacitive detection of said movement.

Alternatively, said electrically-conductive portion extends as far as a distal end of the cable. The electrically-conductive portion may in this case consist of the cable in its entirety. The detection of said movement can then be effected all along the cable.

Additionally, said portion may be in electrical contact with an electrically-conductive portion of the element to which the cable is attached. Thus the cable and the element are both sensitive to the field effect and enable capacitive detection of the proximity of the individual, animal or object.

This is advantageous because the proximity of an obstacle to the element fixed to the cable possibly leading to a collision, it is preferable to render it equally sensitive to the proximity of an obstacle by capacitive detection.

The element fixed to the cable is for example covered with conductive paint or conductive rubber enabling it to be rendered electrically conductive.

Additionally, the cable may include at least one conductor supplying electrical power to the element moved by the cable, that element optionally including an effector that can be supplied with electrical power by the cable, for example via a connector situated on the element, in particular on a cradle. This electrical power supply conductor may be surrounded by at least a screen raised to said predefined potential, said at least one conductive portion being situated outside that screen. Moreover, a grounded shield may surround that screen, said at least one conductive portion being situated outside that shield.

The cable then, as well as pulling and/or lifting the element, enables it to be supplied with electricity. This element may include a working tool such as a painting robot, a riveter or a drill, for example.

Reference Data

The variations of capacitance with time and/or as a function of cable movement may be compared with reference data in order to detect the presence of the individual, animal or object, to identify the latter and/or to estimate the distance that separates the cable from the individual, animal or object.

The reference data may encompass all values representative of the capacitance of the cable or of the variation of capacitance, measured or stored for a given situation.

For example, the reference data may include a voltage variation measured when an individual, animal or object is situated at a distance d from the cable. The detection of a variation of voltage substantially equal to this measured variation enables an alert to be given as to the presence of an individual, animal or object situated at a distance d from the cable.

Reference data may include a set of voltage variations measured when an individual, animal or object is situated at various distances d from the cable. The comparison with this data can then enable estimation of the distance to the individual, animal or object, for example.

Reference data may also include a set of capacitance values measured during the winding of the cable for given unwound lengths/of cable in the absence of an individual, animal or object or in an operating environment comprising static obstacles. The detection of a capacitance for a given length different from that contained in the reference data, may indicate the presence of an individual, animal or object or a malfunction.

The reference data may be measured when the cable is effecting a predefined trajectory and/or for a given length of cable and/or if the cable is in the presence of the individual, animal or object situated at a given distance from the cable.

The reference data may depend on parameters such as the length of the cable and/or a distance separating the individual, animal or object and the cable and/or the presence of static obstacles in the proximity of the cable and/or the presence of an element fixed to the cable.

The reference data may be voltages, capacitances, currents, or be dimensionless, for example voltage ratios. The variation of the capacitance may be determined by the acquisition of at least one voltage delivered by an electronic circuit, in particular by an electronic conditioner.

The reference data may be obtained experimentally, for example in the laboratory.

The reference data may be obtained by means of a calibration step in the operating zone of the cable.

Fingerprint of an Individual, Animal or Object

The method according to the invention may include the acquisition of reference data acquired by effecting a movement of the individual, animal or object in a predefined manner relative to said cable portion, this reference data then being termed a "capacitive fingerprint". This acquisition then makes it possible to obtain the evolution of capacitance induced by the relative movement of the individual, animal or object relative to the cable when the individual, animal or object is situated at a distance d from the cable that varies.

Thus, for a given set of distances the influence of the individual, animal or object on the capacitance of the cable as a function of the distance between the cable and the individual, animal or object is known, that influence being independent of the length of the cable.

There may be defined a relative variation of the capacitance of the cable caused by the approach of the individual, animal or object, known as a "relative sensitivity", depending on the length of the cable $\Delta C(d)/C(l,d)$. The greater the capacitance of the cable, for example after unwinding the cable, the lower the relative sensitivity.

The reference data characteristic of the fingerprint of the individual, animal or object varying substantially as a function, for example, of the height and/or of the surface area of the individual, animal or object, it is advantageous to determine an upper limit and/or a lower limit of the variation of the capacitance and/or the voltage in order to establish the reference data.

The acquisition of the reference data can advantageously make it possible to identify the individual, animal or object detected in the proximity of the cable by comparison with reference data corresponding to as many different individuals, animals or objects.

The reference data preferably includes a capacitive fingerprint on the cable of a human. The capacitive fingerprint on the cable of a human may for example be approximated by a decreasing voltage variation for 1/d with d increasing, d being the distance separating the human from the cable.

Signature of a Trajectory

The method according to the invention may equally include the acquisition of reference data by imparting a predefined movement to the cable and/or to an element attached to the cable, in particular to take into account the variation of the capacitance induced by the presence of a static environment in which the cable moves, this reference data being referred to as a "capacitive signature".

A capacitance variation may be determined in order to define the variation of capacitance expected for a decrease or an increase $l\pm\Delta l$ in the length of the cable. This enables estimation of the expected capacitance variation between two points $M_i$ and $M_{i+1}$ in the absence of an individual, animal or object.

Detection based on this rate of variation in particular makes it possible to circumvent disturbances that are slow relative to the acquisition time, such as variations in the relative humidity of the air, for example.

Safety Measures

The method according to the invention preferably includes the step consisting in effecting at least one predefined action in the event of detection of the proximity of the individual, animal or object to said portion of the cable, this action being in particular chosen from the generation of a visual, sound or tactile alert, stopping movement of the cable and/or of the element moved by the cable, prohibiting starting and/or of restarting.

The speed of movement of the cable may be reduced over the distance travelled by the cable before a possible collision with the obstacle and/or the trajectory of the cable may be modified before a possible collision with the obstacle.

The invention is advantageously used to detect a risk of collision between a human and at least some of the cables of a cable-driven parallel robot or to detect the approach to or avoidance of a boundary cable by a human, for example present inside a retractable safety barrier.

In the case of a boundary cable a sound alert is preferably generated, warning that an individual is approaching or crossing the cable. An alert may equally be sent via a communication means in order to warn of the detection of a change in the environment of the cable relating to an individual, animal or object coming into the proximity of the cable.

In the case of detection of an individual, animal or object, the latter may thereafter be identified by means of an optical sensor, in particular by means of an image recognition system. Identification of the individual, animal or object can enable adaptation of the action to be undertaken, in particular when an obstacle is concerned. Storing data resulting from identification of the individual, animal or object and the detected capacitance variation can enrich the reference data, for example by defining a capacitive fingerprint of the individual, animal or object.

A device according to the invention is advantageously configured to comply with a safety standard such as EN ISO 13849-1 and/or IEC 61508 and/or the CEM 2014/30/EU directive and/or the 2014/35/EU low-voltage directive, preferably covering at least a low level of performance PLa and/or a low safety integrity level SILL respectively, better still by covering a high performance level PLe and/or a high safety integrity level SIL3, respectively.

The device is then advantageously configured to alleviate systematic and/or random failures. Random failures depend in particular on the reliability of the components of the device, defined for example by means of a mean time to failure (MTTF), a failure rate $\lambda_d$ and/or a service life the components; the preferably redundant architecture of the components preferably complies with the 1oo2 or category B to 4 architectures of the standards EN ISO 13849-1 and IEC 61508, respectively, and/or the CEM 2014/30/EU directive and/or the 2014/35/EU low-voltage directive, and/or including surveillance of the functioning of components, and surveillance of the functioning of the device.

Surveillance of the functioning of the device is preferably implemented on starting the device and/or periodically during functioning of the cable. The cable preferably includes at least one element enabling surveillance of the operation of the device when the cable is used in a lifting or traction or boundary device, in particular the at least one element being fixed to the cable and adapted to be detected by a sensor present at the entry of the winder of the device and/or in the proximity of the cable. This element is for example a conductive ring around the cable or an RFID tag situated on the cable, an RFID reader being present at the entry of the winder. The surveillance element may be configured to be detected by an electromechanical detector or by an inductive detector. A surveillance element may be a ring, for example a metal ring, around the cable, or an RFID tag fixed to the cable, an RFID reader being situated at the level of the winder and/or in the proximity of the cable.

Alternatively and/or additionally surveillance elements may be situated inside the cable.

Alternatively and/or additionally surveillance elements may be situated in the proximity of (on the cradle or the effector) or inside the envelope of movement of the cable or cables.

The surveillance elements of the device enable verification that no drift over time comes to call into question the measured detection values of an individual, animal, object or obstacle.

Detection of failure of and/or drift by one of these surveillance elements preferably leads to stopping the functioning of the cable and/or an alert, for example a sound and/or visual alert.

The surveillance elements in particular enable surveillance of the correct functioning of the cable independently of other cables and/or of the environment of the cable.

Cable Structures

A number of cable structures may be used to implement the method according to the invention. The term "cable" must not be understood in a limiting sense and encompasses any elongate flexible structure able to be wound and unwound.

The cable may be sized to withstand the traction forces to which it may be subjected.

A predefined potential may be applied directly to the cable, the electrically-conductive cable portion then being the cable in its entirety. It is for example a steel cable.

Alternatively, the cable may include at least one electrical conductor raised to the predefined potential, in particular different from the core or the strands that take up the traction force. The cable preferably includes at least two electrical conductors each raised to a predefined potential. The two conductors may extend over the same cable portion. The redundancy of electrical conductors in particular enables detection of possible faults in or deterioration of at least one of the conductors. The two conductors may extend over two distinct portions of the cable, the two portions being distinct in terms of length, width and/or position along the cable. The portions may join up, partially overlap or be separate.

A cross-section of the cable is not limited to a circular section. In fact, a cable according to the invention may in particular have a rectangular section or a section of angular sector shape, the cable being for example in the form of a flat sling. It may be a retractable belt between two jib cranes.

The cable may be a steel, for example galvanized, braided multi-strand cable for example in the form of a braided or non-braided steel, for example galvanized, belt of rectangular section. The cable may further take the form of a metal ribbon of rectangular section, perforated or not. The cable may consist of glass fibers surrounded by a conductive film, for example of aluminum or copper, protected by an insulator, notably rubber. The cable may be made of rubber rendered conductive. This list is not limiting.

The cable may be bare or covered by an electrical insulator, for example vulcanized rubber, able to withstand mechanical stresses linked to the functions of the cable. The electrically-conductive portion is preferably covered by an electrical insulator.

The electrical insulator in particular makes it possible to isolate the cable and in particular the electrically-conductive portion from electrical disturbances induced by contact with external elements, in particular the system for guiding, driving and/or winding the cable.

The cable includes for example at least one core preferably adapted to take up the traction forces, said at least one electrically-conductive portion including at least one electrical conductor distinct from the core.

Said at least one electrical conductor of the cable may include one or more electrical conductors, in particular wires, tapes, braids or strips, electrically insulated from the core, in particular by being covered by an electrical insulator, for example vulcanized rubber, and extending along the latter.

The electrical conductors may be electrical wires, for example stranded copper wires, or metal ribbons.

The electrical conductors may be wound helically around the core. The helical winding pitch is advantageously constant along the cable. The shorter the winding pitch the greater the sensitivity of detection. However, the greater the length of the conductors, the greater the self-capacitance. A compromise can be found to optimize the sensitivity of capacitive detection.

When the cable supplies with electricity an element moved by the cable, the latter advantageously includes a grounded first conductive screen covered with an insulator, the insulator itself being covered with a second conductive screen raised to the predefined potential of the cable, that second screen being covered by an insulator. The grounded screen circumscribes electrical disturbances caused by the circulation of electrical current in the cable. The screen raised to a predefined potential enables the sensitivity of capacitive detection to be increased.

The element moved by the cable may be supplied with electrical power by means of an electrical power supply configured to deliver a direct current voltage, for example approximately 24 V or approximately 48 V, a single-phase alternating current voltage, for example approximately 230 V, or a three-phase alternating current voltage, for example approximately 400 V.

A cable of this kind according to the invention advantageously makes it possible in particular to deliver a direct current voltage or a single-phase or three-phase alternating current voltage.

In the case of a direct current voltage, the cable advantageously includes two conductive cores and a protection conductor (this relates to electromagnetic compatibility).

In the case of a single-phase alternating current voltage, the cable advantageously includes two, respectively live and neutral, conductive cores and a protection conductor (depending on the neutral regime chosen and the protection of the connected terminal element).

The conductive cores and the protection conductor carried by the same cable can alternatively be carried by a plurality of distinct cables of the machine according to the invention, in particular three distinct cables.

In a variant, the cable includes at least one protection conductor and four conductive cores, in particular three live phases and neutral, the configuration of the neutral depending on the neutral regime chosen (grounded neutral, grounded to neutral, isolated neutral). A cable defined in this way in particular enables a three-phase alternating current voltage to be delivered. These conductive cores and the protection conductor may alternately be carried by distinct cables of the machine (parallel robot, crane, boundary device, . . . ) as mentioned hereinabove.

A cable according to the invention may carry analog or digital signals, via one or more wires preferably situated in the core and covered by a grounded first conductive screen, itself covered by an insulator, the insulator being covered by a second conductive screen raised to the predefined potential, itself covered by an insulator.

The cable may have at least two successive portions electrically insulated from one another, subjected simultaneously or sequentially to the predefined variable potential, so as to detect the possible presence in the proximity of each of them of the individual, animal or object and to be able to locate the individual, animal or object along the length of the cable.

Location of the individual, animal or object has the advantage of enabling triggering of a safety measure best suited to the situation, for example by modifying the trajectory of the cable in the case of detection and location of an obstacle in the proximity of a cable-driven parallel robot.

The method according to the invention advantageously includes a step in which capacitive detection is effected on the one hand over all the length of the cable and on the other hand over at least one section of the length of the cable, the position of which is known, better still on at least two successive sections of the length of the cable, the respective positions of which are known. This implementation offered according to the invention enables redundancy and location combined.

The individual, animal or object may be located relative to the cable and/or identified by means of at least one optical sensor, for example by means of an image recognition system.

Capacitance Acquisition

Said at least one electrically-conductive cable portion may be raised to a predefined potential V by virtue of being connected to an electronic circuit including in particular a voltage generator.

The capacitance variation is for example detected by measuring the current injected into this cable portion.

The surface electrical charges of the cable being produced by a current I, the latter can be defined indirectly by measuring the voltage at the terminals of a resistance in the electronic circuit, in series with the voltage generator.

The sensitivity of detection advantageously depends on the value of the current flowing in the cable and therefore on the potential to which the cable is raised, the frequency of the voltage generator feeding the cable and the value of the resistance. The sensitivity of capacitive detection may be increased by increasing the value of the predefined potential and/or the frequency and/or by reducing the value of the resistance.

The predefined potential is for example an alternating current voltage, preferably at a frequency between 10 kHz and 100 kHz, in particular a sinusoidal voltage; the potential preferably has a peak-to-peak amplitude between 10 V and 100 V inclusive.

The method according to the invention may include the step consisting in effecting a voltage measurement at the output of an electronic component connected to the cable, for example an instrumentation amplifier, enabling monitoring the current flowing through the electronic component to produce electrical charges on the surface of the cable. The capacitance can be deduced from the measured voltage. The electronic circuit may include one or more operational amplifiers, for example JFETs.

The current measured at the surface of said at least one electrically-conductive portion is advantageously less than 1 mA. Thus any accidental contact, in particular with a human, is free of danger.

The capacitance of the cable may be less than 1 nF, better still less than 100 pF approximately for a cable having a length between 10 m and 20 m inclusive. The detection response time is then short, $\tau = R \times C$, for example equal to 1 μs for a resistance of 10 kΩ. This kind of response time facilitates avoiding any collision as well as faster intervention in the event of intrusion for example.

The capacitive detection response time is advantageously matched to the speed of movement of the cable and/or to the speed of movement of a human on foot.

The model of the capacitance of the whole of the capacitive detection device in the absence of an individual, animal or object may be expressed as follows for a predefined length l of unwound cable:

$$C(l) = \{(k \times l + C_0 + C_{element}) + C_{ext\ env}\} \qquad \text{[Math 1]}$$

where k is the coefficient of capacitance per unit length of the electrically-conductive cable portion, $C_0$ is the capacitance resulting from a set of stray capacitances, $C_{ext\ env}$ is the capacitance resulting from electrical interaction with the static environment, $C_{element}$ is the capacitance of the element fixed to the cable, in particular a cradle and/or an effector moved by the cable. The method preferably includes a step of minimizing the stray capacitance $C_0$, including for example a capacitance resulting from the presence of an electronic conditioner in the electronic circuit and/or the capacitance $C_p$ of a wound cable portion $C_{wound}$. The capacitance $C_{wound}$ is preferably negligible compared to the capacitance of the unwound electrically-conductive cable portion $k \times l$, in particular thanks to the screen raised to the predefined potential and a grounded screen. $C_{wound}$ is preferably less than 10 pF.

Detection System

Another aspect of the invention applies to an installation, in particular a lifting machine or a cable-driven parallel robot, including at least one lifting or traction cable having at least one electrically-conductive portion and a detection system configured to raise said portion to a predefined variable potential and to detect a variation of the capacitance of said portion representative of the presence of an obstacle in the proximity of the latter.

The installation may include at least three lifting or traction cables each having at least one sensitive electrically-conductive portion for the capacitive detection of an obstacle. The cables may each include at least one electrical conductor and an associated detection system. Thus there may be as many detection systems as cables, those detection systems operating simultaneously. The detection systems may have in common at least some of the processing circuits, in particular for acting on the driving means of the cable in the event of detection of an obstacle. There may equally be a detection system associated with at least two cables connected together via for example the effector or the cradle to be moved, with electrical continuity between these two cables.

The cables may be supplied with electricity by an element fixed to the cables. Two cables for example provide respective live and neutral conductors and another cable a protection conductor. The electrical power supply may also be a low-voltage power supply.

Another aspect of the invention relates to a lifting or traction cable including at least one core for taking up traction forces, at least one electrically-conductive shield electrically insulated from the core and at least one electrically insulated detection electrical conductor disposed outside the shield.

The cable may include at least two electrical conductors suitable for capacitive detection together extending along at least a portion of the length of the cable. Alternatively, the two electrical conductors suited to capacitive detection extend over respective different lengths of the cable.

The two electrical conductors may each be raised to a predefined variable potential, simultaneously or sequentially, in order to carry out capacitive detection in accordance with the invention.

A further aspect of the invention relates to an installation, corresponding to a boundary device, in particular a retractable safety barrier, including at least one boundary cable having at least one electrically-conductive portion, a detection system configured to raise said portion to a predefined variable potential and to detect a variation of the capacitance of said portion representative of the movement of an individual, animal or object in the proximity of the latter and relative to the latter. An installation of this kind according to the invention may further in more complex variants supply with power in accordance with at least one of the embodiments described above at least one system that is connected to it, integrated into the cable or external, such as a luminous and/or sound warning system, by a direct current or alternating current voltage and/or include at least one surveillance element as described above.

BRIEF DESCRIPTION OF THE DRAWINGS

The invention will be better understood on reading the following detailed description of non-limiting embodiments thereof and examining the appended drawings, in which:

FIG. 9L is a section of a cable example, FIG. 13 represents a block diagram of one example of an installation according to the invention, FIG. 14 represents an example of the trajectory of two cables fixed to a load, FIG. 15 is a table grouping data independent of the relative humidity of the surroundings recorded during a calibration step.

DETAILED DESCRIPTION

Figure 1:
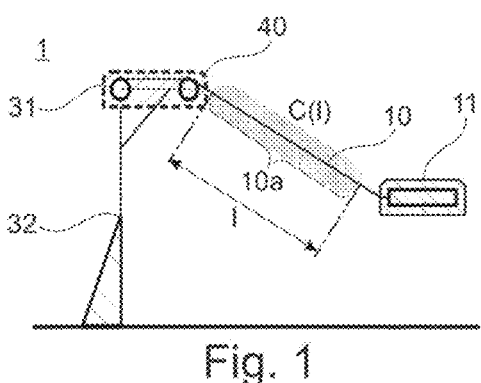
FIG. 1 represents partially and schematically a cable-driven parallel robot installation according to the invention.

There has been represented schematically and partially in FIG. 1 an example of a cable-driven parallel robot 1 according to the invention including a support structure 32, a winding system 31 and a cable 10 at least a portion 10a of which is electrically conductive.

An element, in particular a load 11, may be fixed to the distal end of the cable. The other cables of the robot, connected to the load 11, are not represented.

The winding system 31 is advantageously disposed at the top of the support structure 32, enabling reduction of electromagnetic disturbances and capacitive influences on the cable 10, in addition to reducing the length of the latter.

In a variant that is not illustrated the winding system 31 is moreover situated on the support structure 32, for example at the base of the latter. The length l of the conductive portion may be less than the length L of the cable, as in FIG. 1. For the example from FIG. 1 the end of the cable is not electrically conductive.

The winding system 31 may comprise a motorized winder and/or a coder in order to determine the length of cable unwound.

The coder is preferably an absolute coder implemented at the level of the winding system 31.

The electrically-conductive portion 10a emits a radial electric field around it. The presence of an obstacle leads to a variation of the electric field and therefore a variation of the capacitance of the cable.

The capacitance C of the cable is substantially proportional to the unwound length l of the conductive cable portion sensitive to capacitive effects. This length l may vary when the cable 10 pulls or lifts the load 11. The capacitance of the cable may be estimated using the formula $C(l)=k \times l$, where k is the coefficient of capacitance per unit length.

Figure 2:
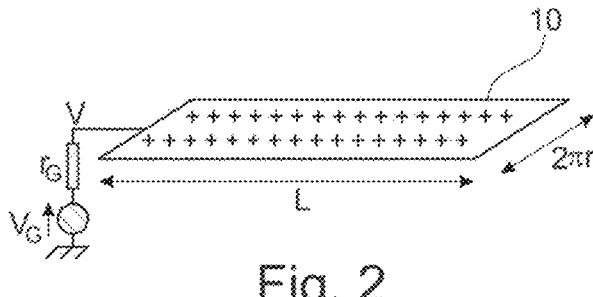
FIG. 2 illustrates the supply of power to a cable by a voltage generator.

FIG. 2 illustrates highly schematically an electrically-conductive cable 10 raised to a predefined potential V by being connected to a voltage generator $V_G$, of internal resistance $r_G$. According to Coulomb's law, the repulsion force of the surface electric charges is equal to the injection force of the generator, the cable 10 being in electrostatic or quasi-static equilibrium for a sinusoidal generator. The surface electrical charges are then distributed homogeneously over all the length L of the cable 10.

13

Figure 3:
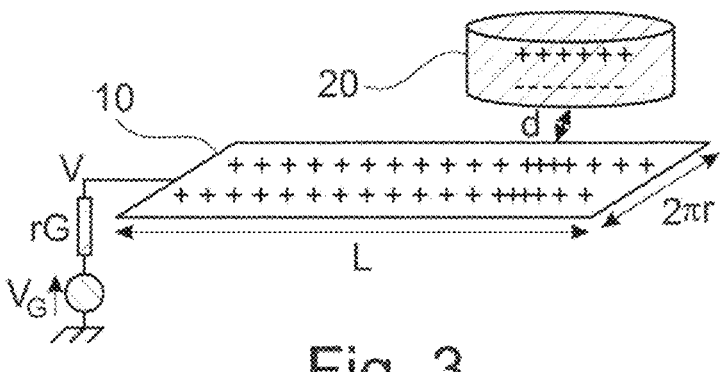
FIG. 3 illustrates the behavior of the cable from FIG. 2 when an individual, animal or object approaches.

FIG. 3 represents a cable 10 similar to the cable from FIG. 2 situated in the proximity of an individual, animal or object 20. The electrical charges on the surface of the cable are no longer distributed homogeneously. According to the theory of corresponding elements, electrical charges of opposite sign situated on the surface of the individual, animal or object react with the cable. The surface electrical charges of the cable 10 no longer oppose the injection force of the generator, and the latter then injects new charges in equal quantity to that interacting with the individual, animal or object 20. The capacitance can then be estimated using the following formula: $C=C_{self}+C_{ext\ env}+C_{ind,ani,obj}$, where $C_{self}$ is the self-capacitance of the structure, the structure being the cable 10 in this example, $C_{ext\ env}$ the capacitance of a static environment, considered nil in this example, and $C_{ind,ani,obj}$ the capacitance of the individual, animal or object 20. There can then be observed an increase in the density of the electrical charges $Q+\Delta Q$ and therefore an increase in the capacitance $C+\Delta C$ and the current $I+\Delta I$ delivered by the generator producing the electrical energy. For a predefined distance d separating the individual, animal or object from the cable, a fixed cable length L and a cable radius r, the charge density may be defined by the formula:

$$Q=I\times t=2\pi rL\sigma=C\times V \qquad \text{[Math 2]}$$

where $\sigma$ is the surface electrical charge density of the electrically-conductive cable portion and t is time. The capacitance may be defined by:

$$C(L) = 4\pi\varepsilon_0 L \times \frac{1}{\ln\left(\frac{d_\infty}{d}\right)} \qquad \text{[Math 3]}$$

where $\varepsilon_0$ is the permittivity of vacuum and is the distance for which $C(d_\infty)\approx 0$.

The distance is for example equal to approximately 0.5 m. The distance is preferably greater than 2 m, better still greater than 3 m.

The individual, animal or object 20 schematically represented in FIG. 3 is for example a human. In particular, the electrical influence on the cable of the individual, animal or object varies with 1/d, d being the distance separating the individual, animal or object.

The portion of cable wound on the winding system 31 does not represent any danger to an obstacle. Moreover this cable portion may be subject to electrical influences by mechanical elements constituting the winding system 31. These electrical influences can create capacitive coupling disturbing capacitive detection of obstacles.

For these reasons the winding system 31 is preferably surrounded by a protection system 40 represented in FIG. 1 that reduces the density of surface electrical charges on the portion of the cable wound onto the winding system. The protection system 40 preferably includes a screen 41 raised to the predefined voltage V of the cable, itself surrounded by a grounded shield 42.

Figure 6:
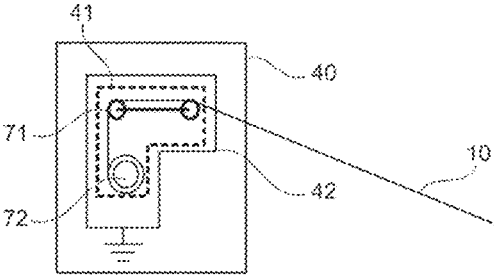
FIG. 6 represents schematically a system for winding the electrically-insulated cable.

FIG. 6 represents an example of the winding system 31 of the cable 10, including one or more pulleys 71 and a winder 72 surrounded by a protection system 40. The latter includes a screen 41 raised to the predefined potential of the cable 10, reducing the surface charge density of the cable portion situated facing this screen 41, and a grounded shield 42 around the screen 41 and protecting the cable from electromagnetic disturbances and external capacitive coupling.

Figure 5:
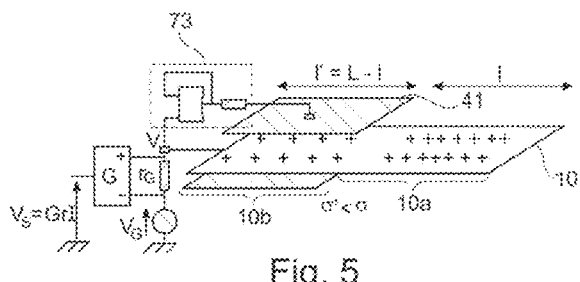
FIG. 5 illustrates the effect of a screen on a portion of cable positioned facing that screen.

FIG. 5 illustrates schematically the effect of a screen 41 positioned facing a cable portion 10. In the FIG. 5 example the screen 41 is raised to the predefined potential V of the cable thanks to a voltage follower. The surface electrical charge density 6' of this cable portion 10b of length l' is less than the surface electrical charge density 6 of the conductive cable portion 10a not situated facing the screen raised to the predefined potential V. In fact, the cable portion 10b facing the screen 41 being at the same potential V as the screen 41 they are under total electrical influence. There is therefore no storage of electrical charges on the surface of this cable portion 10b. The capacitance of the portion 10b of length l' placed facing said screen 41 is therefore rendered negligible compared to the capacitance of the cable portion 10a of length l not placed facing said screen 41:

$$C(L)=C(l)+C(l')\approx C(l)=k\times l \qquad \text{[Math 4]}$$

The lower the surface density $\sigma'$ compared to the surface density $\sigma$, the higher the relative sensitivity of the capacitive detection of the cable portion 10a raised to the predefined potential V not placed facing said screen 41.

The sensitivity of capacitive detection also depends on the distance d of the individual, animal or object 20 relative to the cable 10.

Figure 7:
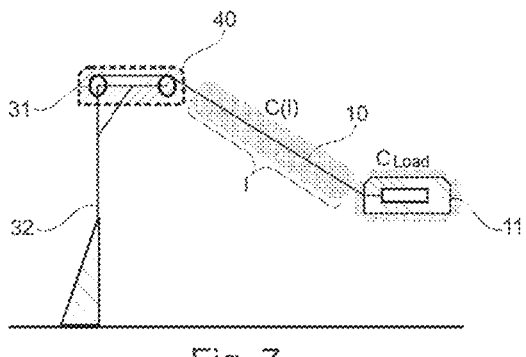
FIG. 7 is a view analogous to FIG. 1 of a variant installation in accordance with the invention.

FIG. 7 represents a variant of the structure 1 from FIG. 1. In this example the load 11 fixed to the distal end of the cable 10 is raised to the predefined potential V of the cable. The electrically-conductive cable portion corresponds to the cable in its entirety. The load 11 is rendered sensitive to the proximity of an obstacle 20 by capacitive detection. The cable portion in contact with the support structure 32 and/or the winding and drive system 31 is electrically insulated by means of a screen 41 raised to the potential V of the cable and/or a grounded shield 42, as in the FIG. 6 example.

The cable portion in contact with the support structure 32 may be situated inside a screen raised to the predefined potential V of the cable 10. The fixings if any and the load may be covered by a conductive material, for example a conductive paint or a conductive rubber. The capacitance of the sensitive systems serving for capacitive detection may then be estimated using the formula $C(l)=k\times l+C_{load}$, where $C_{load}$ is the capacitance linked to the load 11.

Figure 10:
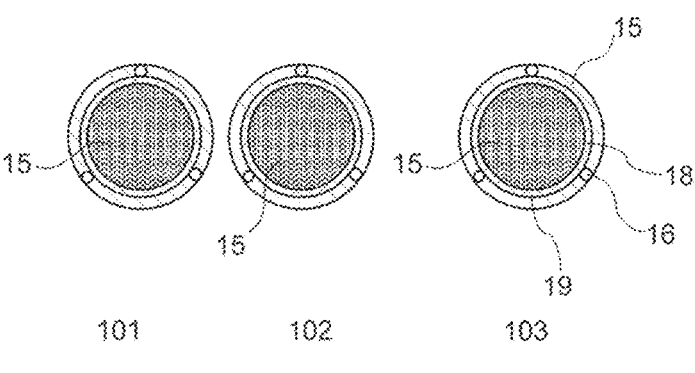
FIG. 10 illustrates the use of three cables to supply with electricity a load fixed to the cables.

Cable-driven parallel robots may comprise at least three cables 101, 102, 103 and the load 11 may be supplied with electrical energy by means of these three cables 101, 102, 103, as represented schematically in FIG. 10. One cable may provide the live conductor, another the neutral conductor and a third a protection conductor. The load 11 is for example supplied with power at an alternating current voltage of 230 V, a frequency of 50 Hz, with an rms current of 3 A.

The load 11 may alternatively be supplied with electrical energy by means of two cables or a single cable.

For example, the load 11 is supplied with power at a direct current voltage by means of two cables.

At least one cable is advantageously configured to enable the transmission of signals, for example by optical transmission or by power line carrier current.

A cable-driven parallel robot preferably comprises at least four cables.

The cable preferably includes a core consisting of an electrically-conductive stranded copper wire, this wire being able to provide the phase conductor, the neutral conductor or a protection conductor. The stranded copper wire can have a diameter of approximately 0.8 mm. The stranded copper wire is preferably surrounded by an insulator, and a shield preferably surrounds the copper wire and the insulator preferably surrounds the shield. The thickness of the insulator and the shield combined is of the order of 0.6 mm, the stranded copper wire with the insulator and the shield then having a diameter of the order of 2 mm.

Figure 8:
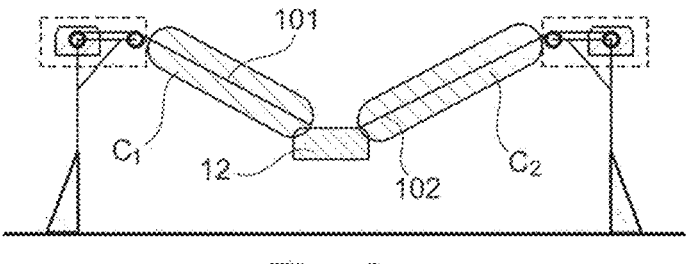
FIG. 8 represents partially and schematically a variant installation in which detection is effected on two cables.

FIG. 8 represents two cables 101 and 102 similar to that from FIG. 7, functioning together to manipulate a load 11 to which they are connected, each cable being at a predefined potential. The cables 101 and 102 have respective self-capacitances C1 and C2.

Interactions between the cables 101 and 102 can potentially disturb obstacle detection. The predefined potential of each cable may be determined in order to limit these electrical influences with other cables and/or the ground and/or a load and/or a cradle and/or a fixing, in particular by causing the predefined potential to vary.

Alternatively, the conductive cable portion or portions is/are subjected to respective variable potentials at different frequencies from one another. In particular, the frequencies may be chosen with a non-integer ratio between them to prevent disturbances caused by harmonics.

Alternatively, disturbances linked to the influence of other cables and/or the ground and/or a load and/or a cradle and/or fixing can be taken into account in the acquisition and storage of reference data, and then through comparison.

Figure 24:
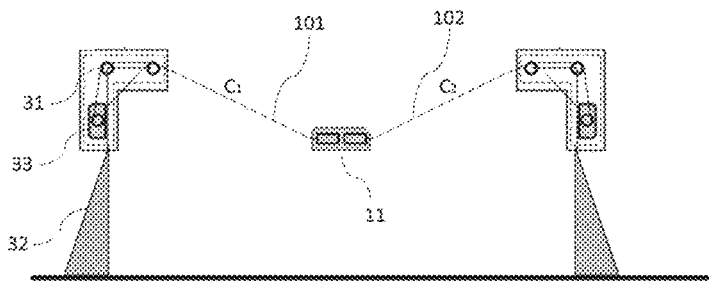
FIG. 24 represents partially and schematically a variant installation in which detection is effected on two cables.

FIG. 24 represents a variant of the structure from FIG. 8 including two cables 101 and 102 with respective capacitances C1 and C2. Each of the support structures 32 includes a winding system 31, preferably including a motorized winder, with a coder 33. The cables 101 and 102 have for example a length L of approximately 10 m and a radius r less than or equal to 4 mm.

Each of the cables 101 and 102 preferably includes at least two detection electrical conductors, the electrical conductors preferably being electrically insulated, preferably by being coated with vulcanized rubber.

Moreover, in the FIG. 24 example the load 11 is provided with at least two electrical conductors, each of the at least two electrical conductors being an extension of one of the cables 101 and 102. The load 11 is for example connected to the cables permanently, this load being for example a pallet fixed to the cables. Alternatively, the load 11 is removably attached to the cables, the electrical conductors of the load being temporarily connected to the electrical conductors of each cable.

Reference Data

Cable-driven parallel robots are able to effect highly diverse tasks such as for example painting various parts of an aircraft or manipulating large and/or heavy loads. Depending on the application, cable-driven parallel robots are provided with different fixings and effect different trajectories. Likewise, safety barriers can be installed for various reasons, detection possibly being intended to detect a particular type of individual or in particular a change in the environment of the cable, corresponding for example to a human crossing a barrier or an animal approaching a dangerous zone.

Executing at least one learning phase enables adaptation to these various applications. This learning phase includes the acquisition of reference data that is specific to the application and serves afterwards as comparison data with a view to detecting an obstacle, or even identifying the latter and/or determining the distance to the obstacle.

FIG. 14 illustrates an example of acquisition of reference data for a predefined cable movement, the cable being for example part of a cable-driven parallel robot and the individual, animal or object representing a potential obstacle. This movement is defined for example by a trajectory from point $M_1$ to point $M_n$, passing through points $M_i$ and $M_j$. The passage from a point $M_i$ to a subsequent point $M_j$ corresponds for example to a variation $\Delta l$ of the length $l_1$, $l_2$ of at least one cable 101, 102, for example $\Delta l = \pm 1$ cm. The coordinates of the point $M_i$ may be defined as cartesian coordinates in the following manner

[Math 5]

$$M_i \begin{cases} xi \\ yi \\ zi \\ \Psi i \\ \theta i \\ \varphi i \end{cases} \Rightarrow M_i \begin{cases} l1i = f1(xi, yi, zi, \Psi i, \theta i, \varphi i) \\ l2i = f2(xi, yi, zi, \Psi i, \theta i, \varphi i) \end{cases}$$

where $\Psi_i$, $\theta_i$, $\varphi_i$ are the angles of rotation, precession and nutation of the cable 101, 102 relative to the support structure 32.

The data represented in the table in FIG. 15 constitutes an example of reference data acquired by having the cables and/or a load attached to the cables effect a predefined movement, for example enabling the variation of the capacitance induced by the presence of the static environment in which the cable moves to be taken into account.

A level of variation may be determined in order to define the capacitance variation expected for a decrease or an increase $l \pm \Delta l$ in the length of one of the cables. The use of a level of capacitance variation in particular enables disturbances that are slow compared to the acquisition time, in particular variations of relative humidity, to be ignored.

The data represented in FIG. 15 may originate from calibration of a cable-driven parallel robot including p cables. For each of the cables j, j being in the range [1, p], a voltage is measured at the points $M_i$, i being in the range [1, n]. On the basis of this data it is then possible to determine $\Delta V_{S,j}(M_{i+1}-M_i)$, representing the level of variation of the voltage between two successive positions $M_i$ and $M_{i+1}$. To determine the presence of an obstacle the reference rates of variation may be compared with the voltages measured at a time t, the time t preferably being the current time:

$$\Delta V_{S,j}[(M_{i+1},t)-(M_i,t]-\Delta V_{S,j}[M_{i+1}-M_i]=\Delta[\Delta V_{S,j}(M(t))]. \quad \text{[Math 6]}$$

To compare the voltage of the reference data and the voltage measured at a time t it is possible to calculate a normalized level at a point $M_i$ for a cable j of length l:

$$\frac{V_S(l_{ij}, t) - V_S(l_{ij})_{ref}}{V_S(l_{ij}, t) - K \times C_{cable}} = \frac{C_{obstacle}}{C_{ext\ env} + C_{obstacle}} \quad \text{[Math 7]}$$

where K is a coefficient linked to the translation into voltage of the capacitance, depending for example on an electronic conditioner. The calculation of a level enables not only variations of relative humidity of the surroundings to be ignored but also elimination of dependency on the unwound length of the cable.

In order to assure safety redundancy, each cable j may include at least two electrical conductors used for capacitive detection, for example at least two electrical wires, for example helically wound along the cable. Each electrical conductor has its self-inductance. The capacitances of the electrical conductors of the same cable are preferably similar, preferably equal. Comparing the capacitances of the electrical conductors of a cable can enable detection of the presence of a fault.

Figure 16:
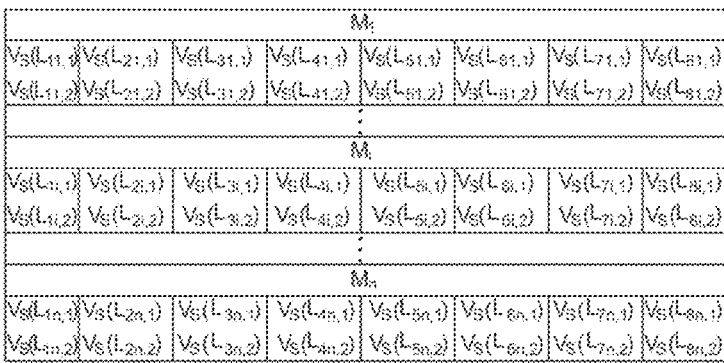
FIG. 16 represents in the form of a table an example of reference data translated into voltages acquired for eight cables, each including two electrical conductors effecting a predefined movement.

The table in FIG. 16 represents the acquisition of reference data for a given trajectory of a structure comprising eight cables functioning in parallel, each cable comprising two electrical conductors. The first line corresponds to the acquisition of the capacitance, translated into a voltage, of the first conductor of each cable when the junction of the eight cables or the barycenter of the load fixed to those eight cables is situated at the point $M_1$. The second line corresponds to the acquisition of the capacitance, translated into a voltage, of the second conductor of each cable when the junction of the eight cables or the barycenter of the load fixed to those eight cables is situated at the point $M_1$.

The electrical conductors of the same cable having substantially equal capacitances, the values in the first line of the FIG. 16 table are advantageously substantially equal to the values in the second line of the table.

Acquisition of reference data can also enable determination of a capacitive fingerprint relating to a particular individual, animal or object. It is possible to acquire reference data characteristic of the capacitive fingerprint of a human approaching a cable for a set of predefined distances separating the human from the cable, for example for distances less than 50 cm, for example with a pitch of the order of 5 cm. The maximum distance is preferably the distance for which $C(d_\infty) \approx 0$.

Figure 17:
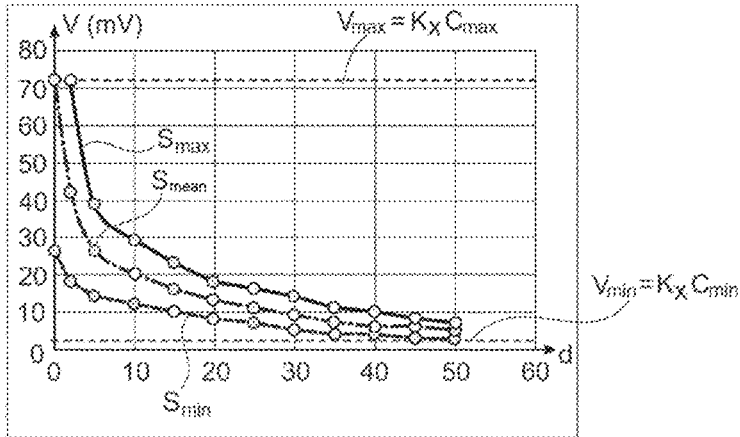
FIG. 17 is a graph illustrating the evolution of the capacitance of the cable for different areas of an individual, animal or object.

FIG. 17 illustrates an example of reference data measurements carried out when a human 20 approaches the cable 10 for a fixed length l of cable. The detection of an individual, animal or object 20 in the proximity of the cable 10 enables it to be stated that said individual, animal or object 20 is situated at a distance less than or equal to the range of capacitive detection, $d \leq d_\infty$. In order to be able to determine the distance d separating the individual, animal or object from the cable, the measured variations of capacitance can be compared to reference data. That reference data is for example voltage values $V_S(l,t)$ measured at regular distance intervals $\Delta d_H$, and preferably sufficiently close together in time for the relative humidity variations to be negligible:

$$V_S(l,t) = K\lambda[\{(k\lambda l + C_{load}) + C_{ext\ env}\} + C_{d_H}(t)] = V_S(d_H)_i. \quad \text{[Math 8]}$$

For $d_\infty$, equal for example to approximately 30 cm, better still equal to approximately 50 cm, $C(d_\infty) \approx 0$ and $V_S(d_\infty)_i = \{(k \times l + C_{load}) + C_{ext\ env}\}$.

The influence of an individual, animal or object 20, in particular a human, when the latter approaches by a distance $\Delta d_H$ from $d_\infty$ can be calculated:

$$V_S(d_\infty - \Delta d_H)_i = V_S(d_H)_i = K\lambda[\{(k\lambda l + C_{load}) + C_{ext\ env}\} + C_{(d_H)}]. \quad \text{[Math 9]}$$

The step consisting in calculating the influence of an individual, animal or object 20, in particular a human, when the latter approaches the cable 10 by a distance $\Delta d_H$ from a preceding position $d_\infty(n-1)\Delta d_H$ may be repeated:

$$V_S(d_\infty - n\Delta d_H)_i = K \times [\{(k \times l + C_{load}) + C_{ext\ env}\} + C(d_H)]. \quad \text{[Math 10]}$$

An individual, animal or object 20 having a fixed surface area and situated at a distance d from the cable 10 induces a change in the capacitance of the cable that is advantageously always the same, in particular that does not vary as a function of the length of the cable.

However, the reference data characteristic of the capacitive fingerprint of a human varying significantly from one human to another as a function for example of their area and/or their height, it is advantageous to determine an upper limit and a lower limit of the voltage variation in order to establish the reference data. The upper and lower limits may be determined by adding, respectively subtracting, a certain percentage of the value, for example 5%:

$$V_S(d_{human}) = V_S(d_{human}) \pm 5\%. \quad \text{[Math 11]}$$

The influence $\Delta C_{human}$ of a human on the capacitance of the cable will always be the same, whatever the sensitive length l of unwound cable. Thus the sensitivity of capacitive detection of the approach of a human and more generally of an individual, animal or object depends on capacitive detection by the unwound length l of the cable:

$$\frac{\Delta V_S(d_H)}{V_S(l, d_H)} = K \times \frac{C(d_H) - C(d_H - \Delta d_H)}{C(l, d_H)} = \quad \text{[Math 12]}$$

$$K \times \frac{\Delta C(d_H)}{\{(k \times l + C_{load}) + C_{ext\ env}\} + C(d_H)}$$

The sensitivity is for example between 0.6% and 4.8% inclusive for $0 < l < 1$ m, between 0.5% and 3.34% inclusive for $1 < l < 5$ m, between 0.45% and 3% inclusive for $5 < l < 10$ m, $d_H$ being between 5 and 30 cm inclusive, the total length of the cable being 15 m and the radius of the electrical conductors being 2 mm.

Alternatively, a plurality of measurements may be carried out in order to determine a minimum capacitance variation and a maximum capacitance variation in the presence of an individual, animal or object 20 as a function of the distance d separating said individual, animal or object 20 from the cable 10 and its surface area and/or height.

Figure 18:
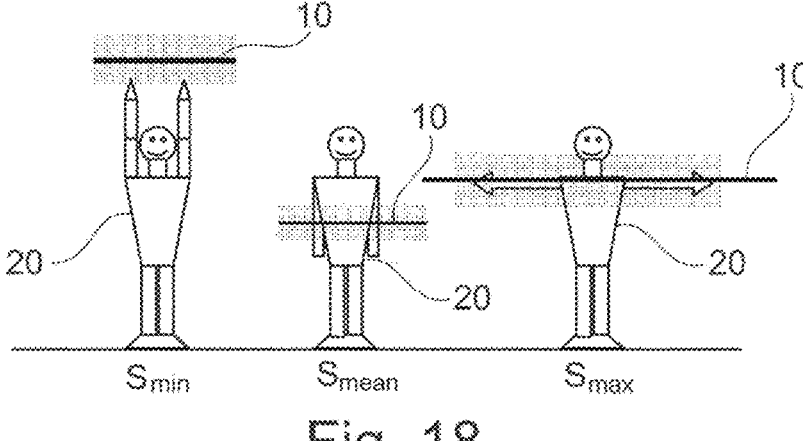
FIG. 18 illustrates different relative configurations of a cable and a human.

In the FIG. 17 example three acquisitions have been carried out for different surface areas $S_{min}$, $S_{max}$, $S_{mean}$ of an individual, animal or object 20 enabling definition of a lower limit $C_{min}$ of capacitance variation and/or an upper limit $C_{max}$ of capacitance variation. In fact, the surface area of a human 20 induces a variation of the capacitance of the cable 10 that may vary as a function of the attitude of the individual, for example with their arms held out, along the body or away from the body, as represented in FIG. 18. Acquisition may also be carried out a number of times for the same type of individual, animal or object 20, for example a human, with individuals, animals or objects having different surface areas, for example at least two humans of different height or different corpulence.

A predefined action is advantageously triggered when a variation of the capacitance between the minimum limit $C_{min}$ and the maximum limit $C_{max}$ inclusive is detected, that action being in particular chosen from the generation of a visual, sound or tactile alert, stopping the movement of the cable and/or of an element driven by the cable, prohibiting starting and/or restarting. Detecting a capacitance variation above the maximum variation limit $C_{max}$ preferably triggers automatic stopping of the movement of the cable.

The change in capacitance may also be defined by a relative sensitivity that then depends on the length l of the electrically-conductive cable portion defined for example by $\tau = C_{ind,ani,obj}(d)/C_{self}(d,l)$. Thus for a length of cable l if a capacitance variation greater than or equal to $\tau$ is detected, the action may be triggered.

Electrical Field

Figure 4:
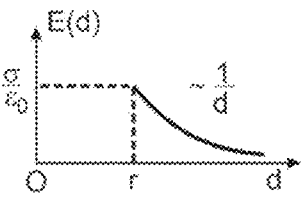
FIG. 4 represents the evolution of the intensity of the electric field as a function of the distance to the cable and the evolution of the voltage as a function of the distance to the cable.
Figure 4:
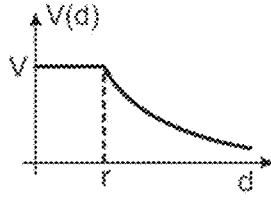

The FIG. 4 curves represent on the one hand the intensity of the electric field emitted by the electrically-conductive cable portion as a function of the distance to the cable and on the other hand that field intensity translated into a voltage. For a fixed length of cable the intensity of the emitted electric field may be defined by the following formula:

$$E(d)_l = \frac{\sigma r}{2\varepsilon_0} \times \frac{1}{d} \qquad \text{[Math 13]}$$

where $\sigma$ is the surface density of the electrically-conductive portion.

The translation of this field into voltage is defined by the formula:

$$V(d)_l = \frac{\sigma r}{2\varepsilon_0} \times \ln\left(\frac{d_\infty}{d}\right) \qquad \text{[Math 14]}$$

The intensity of the electric field depends in particular on the predefined potential V on the electrically-conductive portion of the cable. The range of detection of the change in the environment of the cable may be increased or decreased by varying the predefined potential V.

The electrically-conductive cable portion behaves as a wire antenna with a shielded transmission cable, that is to say the root mean square value of the current is substantially constant over all the length of the cable portion concerned, before decreasing and reaching a zero value at the end of the cable portion concerned.

Cable Structures

FIGS. 9A, 9B, 9C, 9D, 9E, 9F, 9G, 9H, 9I, 9J, 9K, 9L, 9M, 9N, 9O, 9P represent various possible structures of traction or lifting cables according to the invention. These cables emit a radial electric field E as represented in FIGS. 9A-9D.

A traction or lifting cable according to the invention is preferably configured to support a traction force of at least 100 daN and preferably up to 800 daN. A traction or lifting cable according to the invention is preferably configured to withstand a force of at least 100 kgf and preferably a force of up to 800 kgf.

The cable is preferably configured to break only when moving a load of 1000 daN or more. The cable is preferably configured to break when the force is 1000 kgf or more.

The cable may be configured so that it has a safety margin of at least 2, that is to say so that there exists a ratio of at least 2 between the loads to which the cable is subjected during its conventional use and the load leading to rupture of the cable.

The cable may be configured so that it can be wound around a drum, the drum having for example a diameter of approximately 20 cm.

The cable may have a predefined potential applied directly of it, the electrically-conductive cable portion then being the cable in its entirety.

Figure 9A:
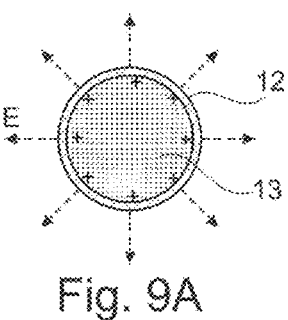
FIG. 9A is a section of a cable example.

FIG. 9A represents a cable of this kind including an insulative sheath 12 and a shield 13 emitting an electric field E generated by direct connection of the cable to a voltage generator, as schematically represented in the FIG. 2 example.

The insulating sheath 12 may be a polyurethane sheath.

Figure 9B:
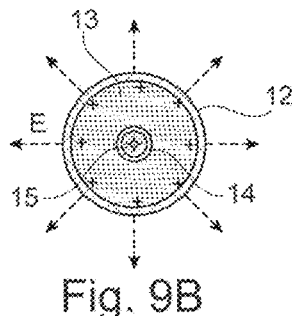
FIG. 9B is a section of a cable example.
Figure 9C:
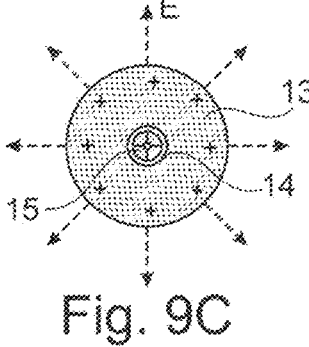
FIG. 9C is a section of a cable example.
Figure 9D:
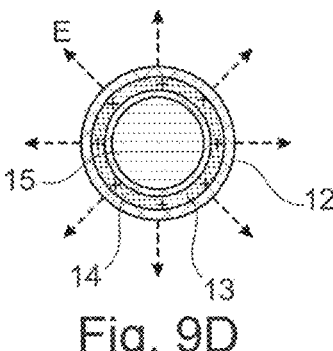
FIG. 9D is a section of a cable example.

FIGS. 9B, 9C and 9D represent a cable including at least a core 15 for taking up traction forces and at least one electrically-conductive shield 13 electrically insulated from the core, in particular by means of an insulator 14.

The advantage of the cable represented in FIG. 9D over the cable from FIG. 9B is that it enables a greater capacitive detection range to be generated when these two cables raised to the same potential V. The capacitive detective range can advantageously be increased, respectively decreased, by decreasing, respectively increasing, the area occupied by the shield 13 in the cable.

The self-capacitance of an electrical conductor is preferably less than 150 pF, better still less than 110 pF. The lower the self-capacitance of the electrical conductor the greater the possibility of increasing the sensitivity of capacitive detection and increasing the capacitive detection distance.

The cable advantageously includes an insulator 12 external to the field 13, as represented in FIGS. 9B to 9J.

The cable may include at least one electrical conductor 16 raised to the predefined potential. The cable preferably includes at least two electrical conductors each raised to a predefined potential. The two conductors may extend over the same portion of the cable or over two distinct portions of the cable.

Figure 9E:
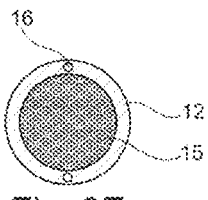
FIG. 9E is a section of a cable example.
Figure 9F:
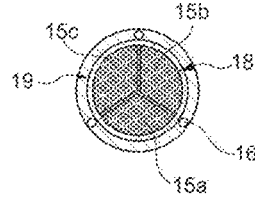
FIG. 9F is a section of a cable example.
Figure 9G:
FIG. 9G is a section of a cable example.
Figure 9H:
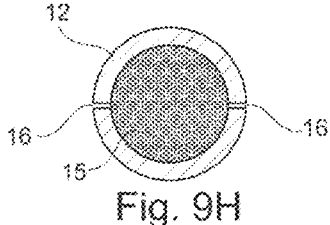
FIG. 9H is a section of a cable example.
Figure 9I:
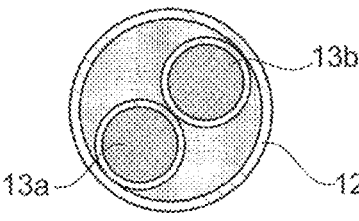
FIG. 9I is a section of a cable example.
Figure 9J:
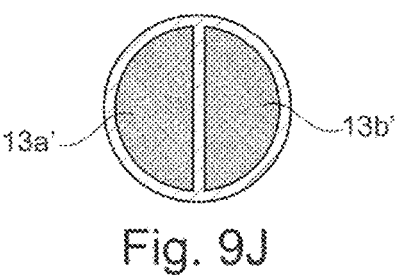
FIG. 9J is a section of a cable example.

FIGS. 9I and 9J represent a cable comprising two circular section sheathed cores 15a, 15b or semi-circular section sheathed cores 15a', 15b'. The cores may be helically wound. The combination of the two cores may be covered with an insulator 12. The presence of at least two cores enables redundancy for safety. At least one electrical conductor 16 may be included in this insulating coating 12.

FIGS. 9E, 9F, 9G and 9H represent cables including at least one core 15 that may be subjected to traction or lifting forces and an insulator 12 surrounding that core. At least one electrical conductor 16 is buried in the insulator 12.

FIG. 9E represents a cable that can be subjected to traction or lifting forces including a core 15 made of steel for example and coated with an insulator 12 that is able to support mechanical forces to which the cable is normally subjected, for example made of rubber. In this example two electrical wires 16 buried in the insulator are wound helically along the core. Each of the electric wires may be connected to the capacitive detection system.

FIG. 9G represents a cable including two ribbon electrical conductors 16 buried in an insulator 12. These electrical conductors 16 can be disposed in a concentric manner as represented in FIG. 9G. The two conductors 16 may be diametrally opposed. FIG. 9H represents a cable also including two ribbon electrical conductors 16 and an insulator 12. The insulator 12 may be formed of two distinct shells separated by the two electrical conductors extending radially from the core 15 as far as the exterior surface of the insulator 12.

The cable from FIG. 9G enables transmission of analog or digital signals by means of at least one wire 17 positioned in the core 15. The wire 17 is preferably covered by an insulator. The wire may be a copper, for example stranded, wire preferably having a diameter of the order of 0.2 mm, preferably covered by an insulator. The insulator may be a sheath, having for example a thickness of the order of 0.3 mm. Alternatively, the wire is an optical fiber covered by an insulating sheath.

The core of the cable according to the invention may be used to supply electrical energy to the load 11 fixed to the cable (medium voltage, single-phase or three-phase current). The load 11 fixed to the cable may also be supplied with power at a low voltage.

FIG. 9F represents a cable structure enabling the load 11 fixed to the cable to be supplied with electrical energy. The cable includes three cores 15a, 15b, 15c insulated from one another that respectively provide the live, neutral and protection conductors. These three cores 15a, 15b, 15c have cross-sections in the shape of preferably identical angular sectors surrounded by a grounded screen 18 surrounded by an insulator, the insulator itself being surrounded by a screen 19 raised to the potential of the cable, itself covered by an insulator. The electrical wires buried in the insulator 12 are then protected from electrical influences caused by supplying the load 11 with electrical energy via the cores 15b and 15c.

A cable according to the invention may include a set of strands, each strand being composed of a set of wires, the wires being galvanized steel wires for example, as represented in the examples from FIGS. 9K to 9N. The cable includes for example 6 or 7 strands, each strand including 7 to 19 wires, the cable having a diameter $d_c$ between 4 mm and 8 mm inclusive. The cable is preferably surrounded by an insulator 12, the thickness of the insulator being for example being between 1 mm and 2 mm inclusive.

In the examples from FIGS. 9K to 9N the cable includes 7 strands each including 7 wires.

Figure 9K:
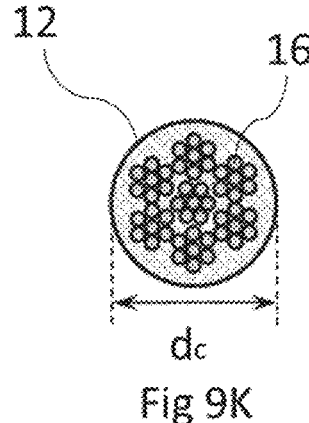
FIG. 9K is a section of a cable example.

In the FIG. 9K example each wire of each cable strand is raised to a predefined variable potential and is subjected to an alternating current voltage. A cable of this kind enables high redundancy for safety.

In the FIG. 9L example a stranded electrical conductor 16 is positioned around the cable strands, its strands preferably being interlaced around the cable strands in a helical manner, the pitch depending on the winding pitch of the strands. The diameter $d_b$ of one of the strands of the electrical conductor 16 may be approximately 0.3 mm.

Figure 9M:
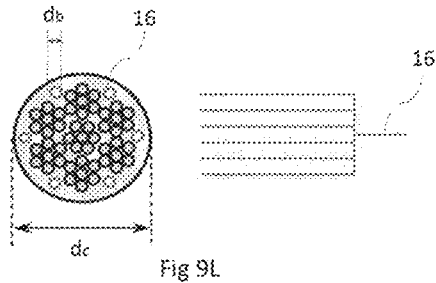
FIG. 9M is a section of a cable example.
Figure 9M:
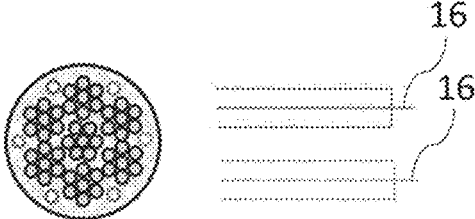

In the FIG. 9M example the cable includes two stranded electrical conductors 16 positioned around strands enabling redundancy for safety.

The strands are preferably surrounded by an insulator.

Each strand may be at a predefined potential and thus form a detection electrical conductor.

Figure 9N:
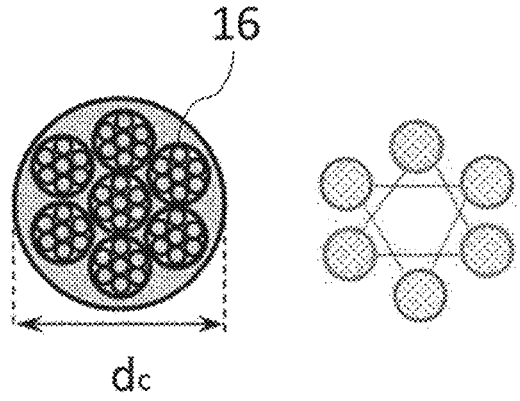
FIG. 9N is a section of a cable example.

Alternatively, a number of strands may be combined to form an electrical conductor. Thus as represented in FIG. 9N the cable includes two electrical conductors each formed of three strands. Other combinations of strands are possible such as for example groups of three adjacent strands. In the cable examples from FIGS. 9K to 9N one of the strands may consist of an electrically-conductive stranded copper wire to enable supply of electricity to the load 11.

Figure 9O:
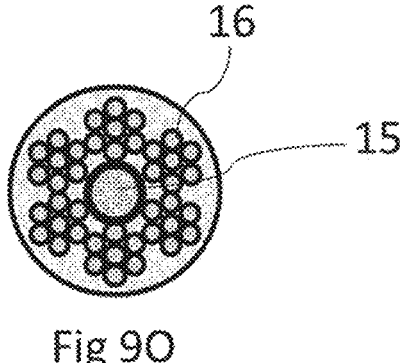
FIG. 9O is a section of a cable example.
Figure 9P:
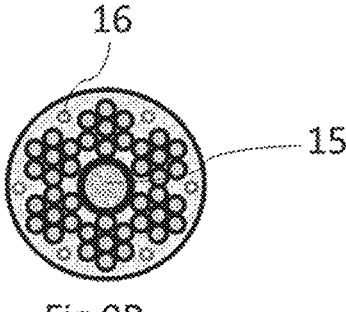
FIG. 9P is a section of a cable example.

FIGS. 9O and 9P represent a variant of this kind.

In FIG. 9O the central strand is a stranded copper wire surrounded by a first grounded shield, itself surrounded by a screen raised to the potential of the other strands.

Alternatively, the grounded shield may be replaced by a band rejector filter positioned at the output of a signal conditioner connected to an electrical conductor, for example at the frequency 50 Hz for a current at 50 Hz passing through the electrical conductors.

When the cable includes at least one detection electrical conductor distinct from the strands and the wires constituting the strands, as in the examples from FIGS. 9L and 9M, the electrical power supply stranded copper wire may be surrounded by a single shield that is grounded, and the strands may be raised to the potential of the electrical conductor. One such example is represented in FIG. 9P.

Generally speaking, the cable may include at least one core for taking up traction forces, a detection electrical conductor distinct from the core, and a signal transmission electrical conductor, the transmission electrical conductor being surrounded by a grounded shield, the core being situated around the shield and being at the potential of the detection electrical conductor, the detection electrical conductor being situated around the core, and an insulator surrounding the detection electrical conductor.

In a preferred embodiment the cable includes at least two electrical conductors used for capacitive detection and at least one electrical wire for the supply of electrical power to the load 11, the electrical wire being surrounded by a grounded shield, the grounded shield itself being surrounded by a screen raised to the potential of the electrical conductors, the electrical conductors being positioned around said screen.

Figure 11:
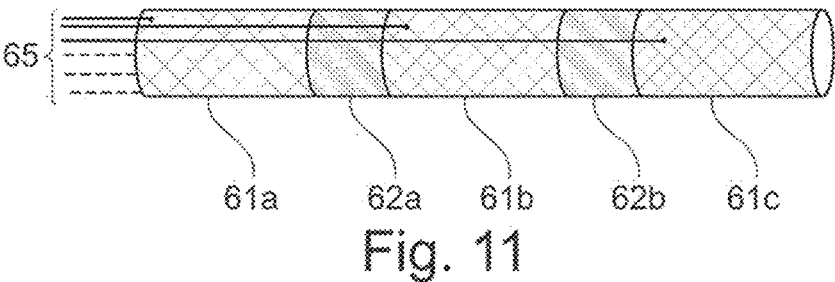
FIG. 11 represents schematically a cable example enabling location of the individual, animal or object.

The cable structures described above enable detection of an individual, animal or object in the proximity of the cable. However, they do not enable location of the individual, animal or object along the electrically-conductive cable portion. To enable location of the individual, animal or object along the cable, preferably over the entire length of the cable, a plurality of sensitive elements for capacitive detection may be positioned on cable portions, for example successive cable portions, preferably separated by an insulator. An example of this kind of cable structure is represented in FIG. 11.

The sensitive elements 61a, 61b, 61c are partitioned along the cable, isolated from one another by isolating elements 62a, 62b. Each sensitive element is connected to a module 65 of the detection system able to detect the proximity of an individual, animal or object. After grouping information from each detection module 65 and processing the information by means of a processor for example, a location of the individual, animal, object along the cable can be defined. The conditioning circuits connected to the detection module 65 may be multiplexed in order to distinguish each sensitive element along the cable.

Figure 12:
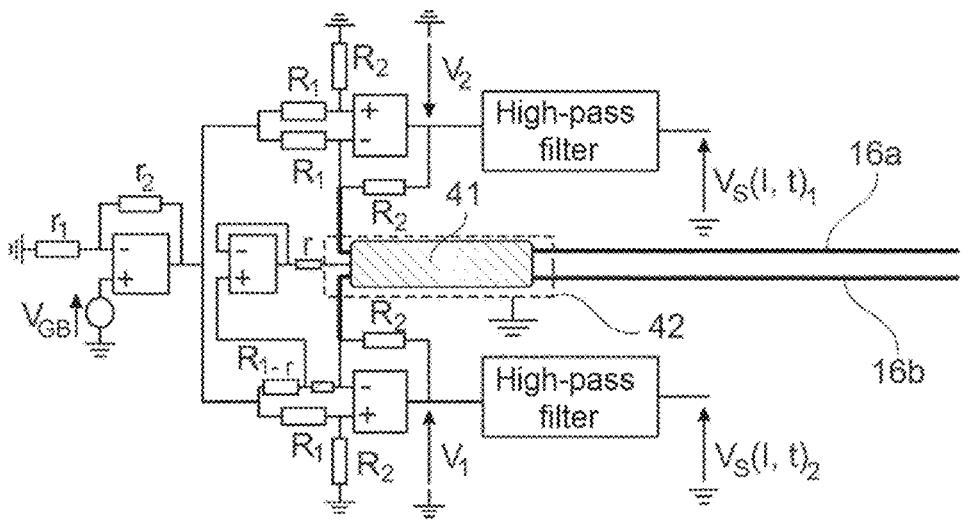
FIG. 12 represents an electronic circuit for providing double detection.

FIG. 12 is an example of an electronic circuit enabling following of the capacitance variations of two electrical conductors 16a and 16b of a cable like that represented in FIG. 9E. The electronic circuit includes in particular an electrical conditioner connected to the electrical conductors translating their capacitance into voltage. The presence of at least two electrical conductors 16a and 16b enables redundancy for safety of the detection of the individual, animal or object. The cable is advantageously configured to respond to faults. These two electrical conductors may generate the same electric field. The two electrical conductors 16a and 16b then send the same information in the absence of an individual, animal or object. In the situation where the information sent by the two electrical conductors diverges, an alert signal may be generated and/or a shutdown or maintenance measure may be applied. Divergent information may be caused by the presence of an individual, animal or object, damage to an electrical conductor, a fault or any other incident disturbing the detection of a change in the environment of the cable by at least one of the conductors.

In normal operation and in the absence of an individual, animal or object the electrical conductors preferably always send the same information.

A damaged electrical conductor, a fault or any other incident disturbing the detection of a change in the environment of the cable by at least one of the conductors may be determined by comparison of the information sent by the electrical conductors and information sent by at least one reference electrical conductor and/or predetermined reference data.

For example, in the electronic circuit in FIG. 12, $R_1=1$ k$\Omega$ and $R_2=10$ k$\Omega$. Then I<1 mA for a frequency equal to 100 kHz and a peak-to-peak voltage equal to 100 V. This current is not dangerous in the event of contact with a human.

The electronic circuit may include a high-pass filter, filtering in particular the 50 Hz mains. The electrical conductors 16a and 16b may be protected from electrical influences caused for example by the supply of the load 11 with electricity by the core of the cable.

Each cable is preferably connected to a signal conditioner. Each cable may be connected to a signal conditioner by means of a Bayonet Neill-Concelman (BNC) plug. Thus an installation according to the invention preferably includes at least as many signal conditioners as cables. An insulator may cover any cable guide, drive and/or winding system, as in FIGS. 19 and 20.

Figure 19:
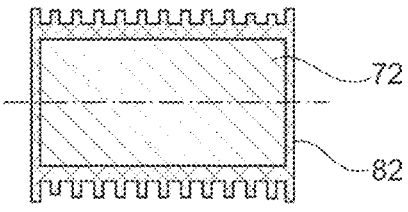
FIG. 19 represents schematically an electrically-insulated winding drum.

In FIG. 19 a winding drum 72 covered with an insulator 82 is represented.

Figure 20:
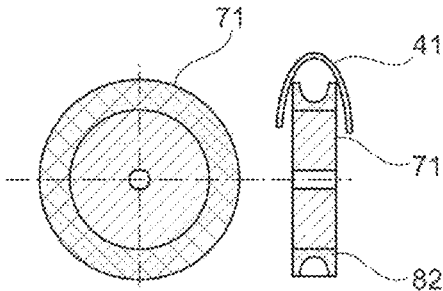
FIG. 20 represents schematically an electrically-insulated pulley.

In FIG. 20 a pulley 71 covered with an insulator 82 is represented. The pulley 71 may be entirely made of insulating material. Alternatively the pulley 71 may be made of metal covered with an insulating material 82; the metal may be raised to the potential V of the cable or faired by a screen 41 raised to the potential V of the cable, the cable preferably being covered by an insulator.

Figure 23:
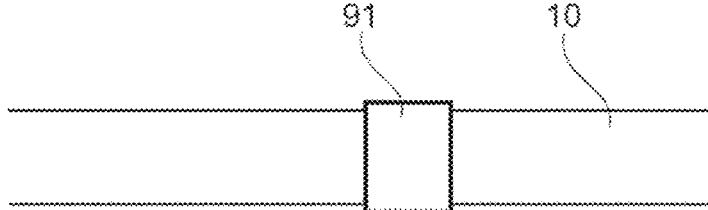
FIG. 23 represents schematically a ring around the cable according to the invention.

As illustrated in FIG. 23 the cable 10 may also include at least one element 91 enabling surveillance of the functioning of the cable, for example when the latter is used in a lifting or traction device or a boundary device. This element may in particular be a preferably metal ring around the cable. This element may in particular be detected by an electromechanical or inductive sensor situated at the entry of a cable guide, drive and/or winding system or in the proximity of the cable. This element 91 may also be an RFID tag fixed to the cable, the sensor situated at the entry of the cable guide, drive and/or winding system or in the proximity of the cable then being an RFID reader.

Figure 21:
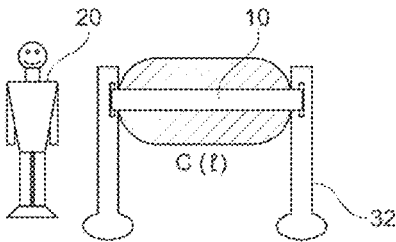
FIG. 21 represents schematically a retractable safety barrier installation according to the invention.
Figure 22A:
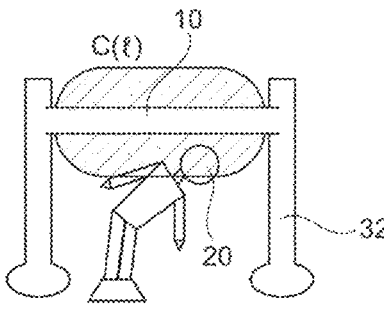
FIG. 22 represents schematically a situation of intrusion by an individual.
FIG. 22b represents schematically a situation of an individual approaching the cable.
Figure 22B:
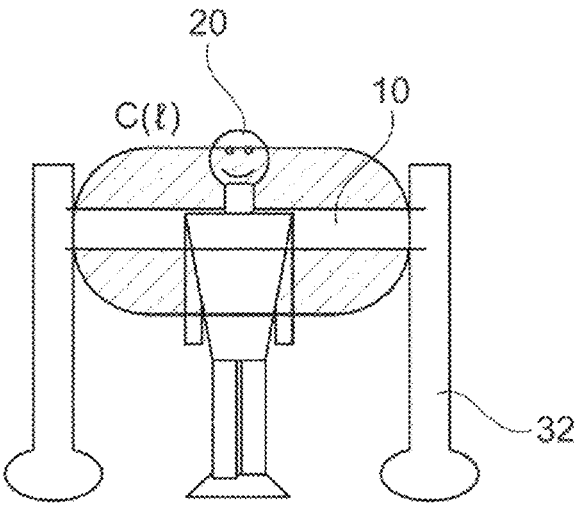

FIG. 21 represents an example of a safety barrier installation according to the invention including a cable 10 extending between two support structures 32. A structure of this kind is configured to detect a change in the environment, in particular if an individual 20 approaches the barrier formed by the cable 10, as represented in FIG. 22b, or crosses the barrier formed by the cable 10, the individual passing for example under the cable, as represented in FIG. 22a, or over the cable.

The capacitive influence of the support structures 32 is advantageously taken into account in the static environment of the cable.

A system 31 for winding the cable 10 may be situated in at least one support structure 32, that system preferably being surrounded by a protection system 40.

FIG. 13 is a block schematic representing an embodiment of the method of the invention. A generator supplies with power the capacitive sensor or sensors positioned on the cable or cables of a robot, a lifting and/or traction machine or a safety barrier.

The processing system may include a processor, in particular a microcontroller, and a data analyzer, in particular analyzing the variations in the current passing through the cables, thus enabling definition of the presence or not of an individual, animal or object, better still of locating an individual, animal or object, better still of locating the individual, animal or object along at least one cable, even better estimating their distance from the cable, in particular by comparing the voltages, currents or capacitances measured with reference data. Additionally, an alarm system is connected to the processing system. The alarm system may be a sound and/or a visual system. The processing system may equally be connected to a control interface of a robot, emergency measures being programmable on said processing system, in particular an emergency stop or trajectory modification.

Figure 25:
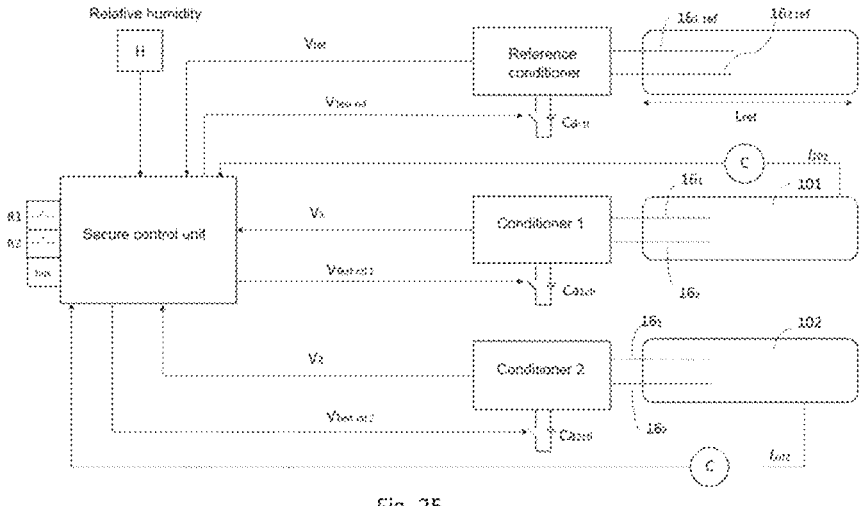
FIG. 25 represents a block schematic of an example of an installation according to the invention.
Figure 29:
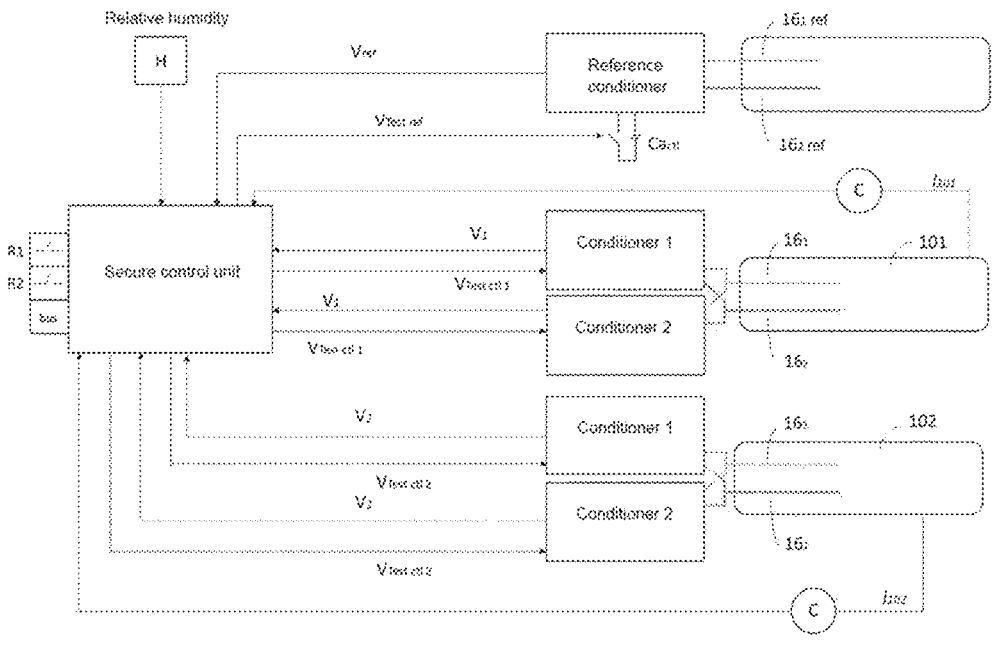
FIG. 29 represents a schematic of an example of an installation according to the invention.

FIG. 25 represents a block schematic of an example of an installation according to the invention including two cables each including two electrical conductors $16_1$ and $16_2$ configured for capacitive detection around the cables 101 and 102 of respective capacitances $C_1$ and $C_2$, and a reference cable also including two electrical conductors $16_{1\ ref}$ and $16_{2\ ref}$, the reference cable being positioned at a location that is not disturbed by any possible obstacle. The reference cable is preferably at all times in the same environmental conditions of the cables 101 and 102 such as for example the ambient relative humidity. Each cable may be connected to a signal conditioner, and as illustrated in FIG. 29 each cable 101, 102 is preferably connected to at least two signal conditioners, enabling redundancy for safety to be assured.

Figure 26:
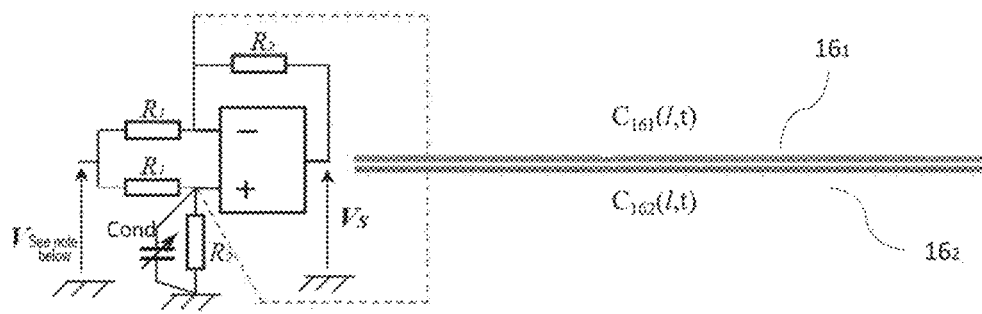
FIG. 26 represents an example of a signal conditioner.
Figure 28:
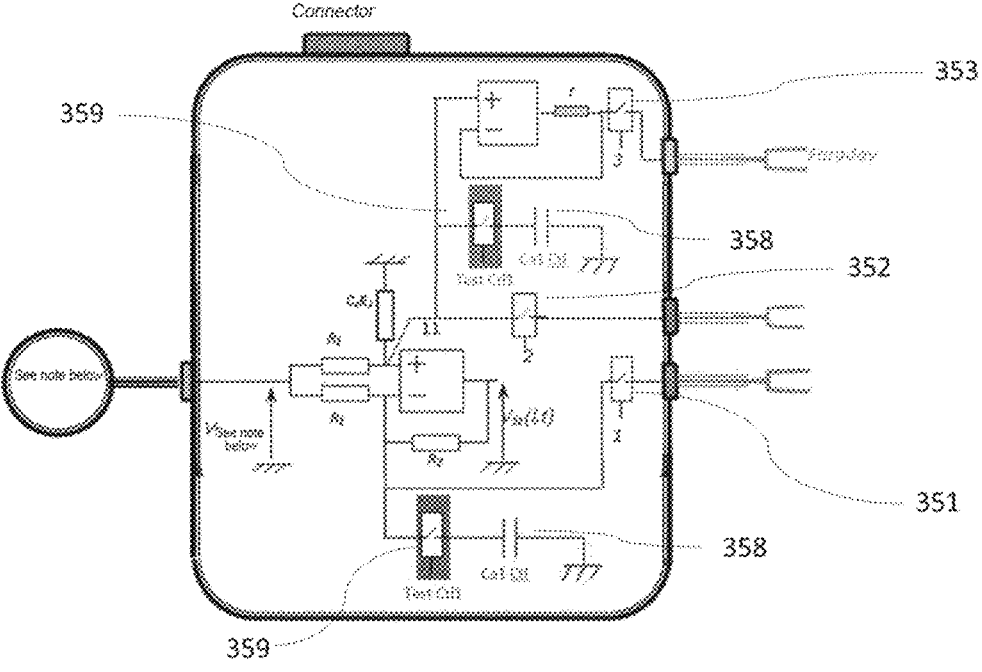
FIG. 28 represents an example of a signal conditioner.

In the FIG. 25 example the signal conditioners are for example similar to that from FIG. 26 or from FIG. 28.

The example signal conditioner represented in FIG. 26 is connected to a cable including two electrical conductors $16_1$ and $16_2$. The same voltage $V_{GBF}$ is applied to the two inputs of the signal conditioner (operational amplifier). The output voltage $V_s$ is then proportional to the difference between the capacitances of the electrical conductors $C_{161}(l,t)$ and $C_{162}(l,t)$. If the capacitances $C_{161}(l,t)$ and $C_{162}(l,t)$ of the electrical conductors are equal, then $V_s$ is equal to 0 if there is no obstacle situated in the proximity of the cable. The signal conditioner may additionally include at least one capacitor Cond enabling fixing of an operating point of the signal conditioner and adjustment of the output voltage V.

The signal conditioner preferably includes a printed circuit having a capacitance of less than 4 pF, even better less than 3 pF.

The capacitance of the signal conditioner depends on the capacitance of the electrical conductors of the cable and on the capacitance of the printed circuit of the signal conditioner. A relative humidity sensor is preferably used that preferably acquires the value of the relative humidity periodically, for example at one minute intervals. The coefficient of capacitance per unit length of an electrical conductor can then be estimated:

$$k_i^*(t) = \frac{2\pi\varepsilon_0}{\ln\left(\dfrac{d_\infty}{r_i}\right)} \times \varepsilon_{air-RH\%} \qquad \text{[Math 15]}$$

where $\varepsilon_{air-RH\ \%}$ is the permittivity of air as a function of the relative humidity, $\varepsilon_0$ is the permittivity of vacuum, is the distance for which $C(d_\infty)\approx0$, and $r_i$ is the radius of the electrical conductor, $i\in[1,2]$, the cable in this particular example including two electrical conductors.

Moreover, the electrical conductors may influence one another. If the electrical conductors are raised to the same variable potential, the electrical conductors exert repulsion forces on one another. Thus the coefficient of capacitance per unit length of an electrical conductor can be defined by:

$$k_i=k_i^*-\gamma \qquad \text{[Math 16]}$$

where $\gamma$ is a positive coefficient reflecting the repulsion force between the electrical conductors. Reduction of the capacity per unit length enables the capacitive sensitivity of the cable to be increased.

Finally, the external environment can also influence the capacitance of the electrical conductors, such as for example walls, the ground, static elements around the cable. All of these interactions may be translated as follows:

$$C_{i_{ext\ env}}(l, t)_M = \sum_i \varepsilon_{air}(t) \times k_{i_{ext\ env}} \times d_i \qquad \text{[Math 17]}$$

where M refers to the spatial position of the cable, $k_{i\ ext\ env} \times d_i$ corresponds to the influence on the cable of an element that is part of the external environment, the element being separated from the cable by a distance $d_i$.

The capacitance of the signal conditioner can then be deduced from the above:

$$C(l,t)_M = (C_{pr\ circuit} + \text{Cond}) + \varepsilon_{air}(t)\{kl + \Sigma k_{i_{ext\ env}} \times d_i\}_M \qquad \text{[Math 18]}$$

where $C_{pr\ circuit}$ is the capacitance of the printed circuit of the conditioner and Cond is the capacitance of the capacitor for fixing an operating point of the signal conditioner.

In the FIG. 25 example the conditioners preferably each include a capacitor $Ca_{ctl}$, $Ca_{1\ ctl}$, $Ca_{2\ ctl}$ for fixing an operating point and adjusting the output voltage of said conditioners.

As a general rule, the signal conditioner is preferably configured so that it has a high voltage response stability, for example a drift over time less than 3% of the voltage delivered for the detection of an obstacle situated at 30 cm and/or so that it enables detection of a human situated at 30 cm or less, the capacitance of the electrical conductors varying by less than 1% for a distance of 30 cm or less, and/or so that the response time of the signal conditioner is of the order of a few microseconds, preferably less than 50 microseconds.

An installation according to the invention may include at least one coder C measuring the length l of the electrically-conducting cable portion and/or a relative humidity sensor H and/or at least one reference cable connected to a reference conditioner, the reference cable being positioned at a location that is not disturbed by any obstacle and preferably being at all times subject to the same environmental conditions as the cables 101 and 102 such as for example the ambient relative humidity. The installation preferably includes one coder per cable 101, 102, each coder measuring the length $l_{101}$, $l_{102}$ of the electrically-conductive cable portion of the cable to which it is connected.

The coder may be of absolute type or incremental type.

The coder is preferably an absolute coder. In the case of an incremental coder, the latter is employed in variants of the invention including an element 91 as represented in FIG. 23 enabling surveillance of the functioning of the cable, for example a ring or an RFID tag.

The humidity sensor H and/or the reference cable make it possible to measure the relative humidity, to verify and/or to correct drift in capacitive detection, and to have reference values enabling for example voltage comparison and/or correction of the functioning of the installation.

In the FIG. 25 example the installation includes in particular two coders C measuring the lengths $l_{101}$, $l_{102}$ of the electrically-conductive cable portions, a relative humidity sensor H and a reference cable connected to a reference conditioner.

Generally speaking, the installation includes at least one reference cable connected to at least one reference conditioner.

Each coder C is preferably configured to respect a safety standard, such as the NF EN ISO 13849-1 standard and/or the IEC 61508, preferably covering at least a low-performance level PLa and/or a low safety integrity level SILL respectively, better still covering a high performance level PLd or PLe and/or a high safety integration level SIL2 or SIL3, respectively.

The relative humidity sensor is preferably configured to comply with a safety standard such as the NF EN ISO 13849-1 standard and/or the IEC 61508 standard, preferably covering at least a low performance level PLa and/or a low safety integrity level SILL respectively, better still covering a high-performance level PLd or PLe and/or a high safety integrity level SIL2 or SIL3, respectively.

An installation according to the invention preferably includes a secure control unit that can be connected to one or more output relays and/or buses, as illustrated in FIG. 25. The output relay or the bus can be triggered if an obstacle has been detected in the proximity of at least one cable of the installation.

The FIG. 25 installation includes two output relays $R_1$ and $R_2$. The output relays may be connected to control an actuator configured to effect at least one predefined action in the event of detection of the proximity of an obstacle. The output relays may be configured to act on the movement of the cable and in particular to enable the movement to be stopped in the event of detection of an obstacle. These output relays preferably comply with a safety standard such as the EN ISO 13849-2 standard.

Instead of or in addition to the output relays, the secure control unit is connected to a safety bus, preferably configured to comply with a safety standard, such as the ISO 13849-1 standard and/or the IEC 61508 standard, preferably covering at least a high-performance level PLe and/or a high safety integrity level SIL3, respectively.

The secure control unit measures the voltage $V_{ref}$ at the output of the reference conditioner, the voltage $V_1$ at the output of the conditioner 1, and the voltage $V_2$ at the output of the conditioner 2, the voltage $V_{ref}$ depending on a reference cable, the voltage $V_1$ depending on a cable 101 and the voltage $V_2$ depending on a cable 102.

The reference cable may have the same characteristics as at least one of the cables 101 and 102. The reference cable has a fixed length $L_{ref}$, preferably of 1 m, 2 m or more than 2 m. The length $L_{ref}$ of the reference cable is preferably substantially the same as the mean length $l_{101}$, $l_{102}$ of the electrically-conductive cable portion of at least one of the cables 101 and 102 when said cable effects a particular movement.

The fixed length $L_{ref}$ of the reference cable is advantageously between, inclusively, on the one hand a minimum length value from among minimum values of the electrically-conductive portions of the cables 101, 102 and on the other hand a maximum length value from among the maximum values of the electrically-conductive portions of the cables 101, 102.

The secure controlled unit may compare the measured voltages with a detection threshold, and the detection threshold preferably depends on the length L of the cables 101 and/or 102, more preferably on the length l of the electrically-conductive cable portion. If at least one of the voltages $V_1$ or $V_2$ is greater than or equal to the detection threshold, at least one of the output relays $R_1$ and $R_2$ may be triggered, better still both relays may be triggered. The output relays may be triggered by contact mechanically guided by a logic unit of the secure control unit, the relays preferably employing positive logic.

The control unit is able to detect at least one, and preferably all, of the voltage variations of the cables including at least one electrically-conductive cable portion. A variation may be compared with a fingerprint of a human, the fingerprint being determined beforehand. For example, for a cable with an unwound length L of approximately 10 m, including two electrical conductors, the fingerprint of a human can be detected as follows: $\Delta V$ is of the order of 24 mV when a human is situated 50 cm from the cable, $\Delta V$ is of the order of 30 mV when a human is situated 40 cm from the cable, $\Delta V$ is of the order of 42 mV when a human is situated 30 cm from the cable, $\Delta V$ is of the order of 60 mV when a human is situated 20 cm from the cable, and $\Delta V$ is of the order of 93 mV when a human is situated 10 cm from the cable.

The secure control unit preferably calculates adjusted voltages $V_{1\ adjusted}$ and $V_{2\ adjusted}$. The adjustment of these voltages $V_1$ and $V_2$ preferably depends on the relative humidity of the surroundings. The voltage values $V_1$ adjusted et $V_2$ adjusted then depend on measurements effected by the relative humidity sensor H. Alternatively and/or additionally, the voltage values $V_{1\ adjusted}$ and $V_{2\ adjusted}$ are calculated relative to the reference electrical conductor, for example $V_{1\ adjusted} = V_1 \pm V_{ref}$ and $V_{2\ adjusted} = V_2 \pm V_{ref}$.

The adjusted voltages may depend on the ambient relative humidity and/or a predetermined voltage variation, for example via the determination of a fingerprint and/or of an electrically-conducting cable length and/or a reference cable.

The adjusted voltages may be compared to the detection threshold. If at least one of the adjusted voltages is greater than or equal to the detection threshold, at least one, better still both of the output relays $R_1$ and $R_2$ are triggered.

Alternatively and/or additionally, the output relays $R_1$ and $R_2$ may be triggered if the voltage $V_1$, $V_2$, $V_{1\ adjusted}$ and/or $V_{2\ adjusted}$ is less than or equal to a predefined value and/or greater than or equal to a predefined value.

At least one of the output relays $R_1$ and $R_2$ may be triggered if the difference between the voltage $V_1$ and the voltage $V_2$ exceeds a predefined value and/or if the difference between the voltage $V_{1\ adjusted}$ and the voltage $V_{2\ adjusted}$ exceeds a predefined value. In fact, in the absence of an obstacle in the proximity of the cables 101, 102, the voltages $V_1$ and $V_2$ are preferably substantially equal. The predefined value may depend on a predefined distance separating an obstacle and the cable.

The secure control unit advantageously has a redundant architecture. The secure control unit is preferably configured to have an HFT fault tolerance of 1. The secure control unit is advantageously configured to comply with a safety standard, such as the NF EN ISO 13849-1 standard and/or the IEC 61508 standard, preferably covering at least a low performance level PLa and/or a low security integrity level SILL respectively, better still covering a high performance level PLd or PLe and/or a high safety integrity level SIL2 or SIL3, respectively.

FIG. 29 represents a block schematic of another example of an installation according to the invention in which each of the two cables is connected to a respective signal conditioner, the electrical conductors 161 and 162 of a cable 101 and 102 being connected to each of the two conditioners connected to said cable.

Figure 27:
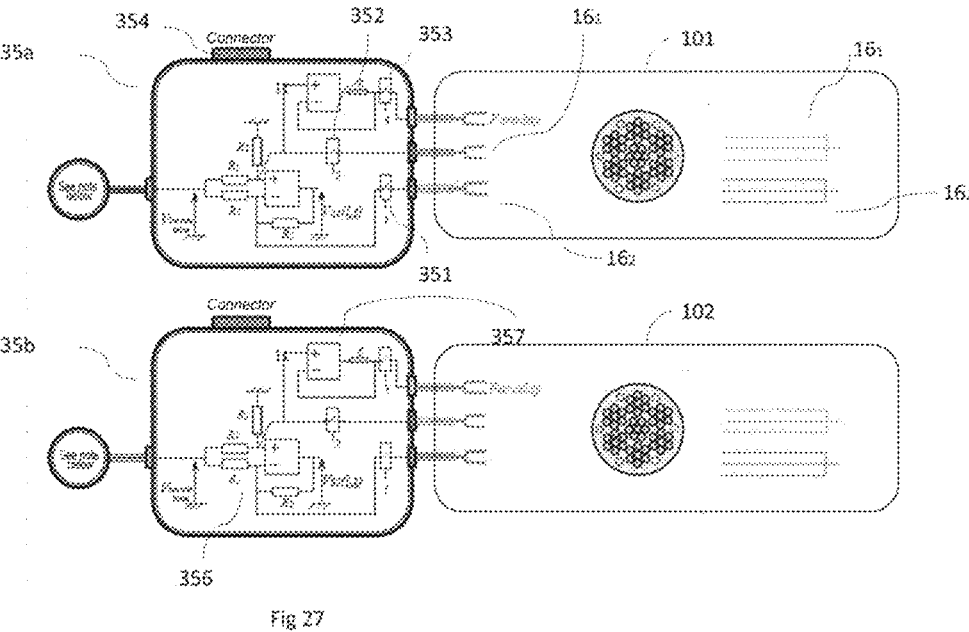
FIG. 27 illustrates two cables of an installation according to the invention connected to signal conditioners.

FIG. 27 represents an embodiment including two independent and identical channels 35a and 35b each including a conditioner connected to a cable 101, 102.

The two channels 35a and 35b may function sequentially.

Each conditioner includes a connector 354 enabling the supply of power to operational amplifiers 356 and 357, the connector delivering for example a supply voltage of +/−45 V. The connector 354 can also control switches 351, 352, 353. The switch 353 advantageously enables a part of the cable, for example the shield of the cable, to be raised to the potential of the electrical conductors. In particular this makes it possible to prevent disturbances if the cable serves to supply electrical power to the load and/or for signal transmission.

A generator with two synchronized output channels preferably delivers the input signals of the two channels $V_{GBF1}$ and $V_{GBF2}$.

A Faraday screen preferably surrounds each of the two conditioners in order to prevent any capacitive coupling. The generators GBF1 and GBF2 need not be surrounded by the screen. At least one oscillator preferably delivers the input signals. The oscillator may be surrounded by the Faraday screen. The oscillator may have a frequency of approximately 10 kHz. The Faraday screen may be a box including a conductive interior wall raised to the predefined variable potential of the electrical conductors by means of the voltage follower amplifier 357 and an exterior wall electrically insulated from the interior wall. The generators may be connected to the screen by means of BNC plugs.

A BNC plug and a shielded cable may be used to connect each of the cables 101, 102 to its signal conditioner, the core of the shielded cable connecting the signal conditioner to the cable and the shield being raised to the predefined variable potential of the electrical conductors of the cables 101, 102, for example through being connected to the voltage follower amplifier 357.

The printed circuit of the signal conditioner that supports the components may be fastened to the Faraday screen. The printed circuit may preferably not be fastened to the screen, enabling easy changing of components when necessary, for example when one of the components is defective.

The operational amplifiers are for example AOP 445. They may be positioned on 14-pin DIP (tulip) supports. They may be provided with a trimmer, for example of 100 kΩ, in order to adjust the offset voltages. The positive and negative power supply pins may each include a capacitor for stabilizing the supply voltage, for example each of the positive and negative supply pins includes a 10 nF capacitor.

The switches may be analog switches, for example MAX14756 or DG411 switches. They may be mounted on 16-pin DIP (tulip) supports.

A signal conditioner as shown in FIG. 27 is particularly suitable for cables according to the invention and in particular a cable as represented in FIG. 9N or a cable as represented in FIG. 9P. A check enabling verification of correct functioning of the installation is preferably carried out regularly by the secure control unit, for example periodically and/or each time that the installation is restarted. The check preferably includes the comparison of at least one of the voltages $V_1$ and $V_2$ with a predefined value. The predefined value depends for example on $C_{a\ ctl}$. At least one check on the functioning of the signal conditioner is preferably effected periodically and/or each time the installation is restarted.

For example, the output voltage $V_s$ is compared to a reference value $V_{s\ ref}$ when the switches 351 and 352 are open, the conditioner then no longer being in contact with the electrical conductors of the cable.

Alternatively and/or additionally the signal conditioner includes at least two control switches 359, each in series with a control capacitor 358, as illustrated in FIG. 28, the control capacitors being connected to ground, one of the control switches being connected to the positive supply pin of the operational amplifier and the other control switch being connected to the negative supply pin of the operational amplifier. When the switches 351 and 352 are open and the control switches 359 are closed, it is then possible to compare the output voltage $V_s$ measured at the output of the operational amplifier with a value known in advance and depending on the parameters of the control unit and of the components of the signal conditioner.

If a malfunction is detected, at least one safety measure is implemented, for example an emergency stop and/or non-restarting of the installation.

When a cable is connected to a plurality of conditioners, the output voltages $V_s$ measured at the output of the operational amplifiers of the various conditioners may be compared during the check on the functioning of the conditioners.

Alternatively and/or additionally, the output voltage $V_s$ measured at the output of the operational amplifier may be compared with the voltage $V_{s\,ref}$ from a reference conditioner connected to a reference cable.

Of course, the invention is not limited to the embodiments that have just been described.

In particular, other information may be measured and/or stored, such as a relative speed of the cable relative to the individual, animal or object or a detection error rate. The processing system may be configured to transmit information intended to be displayed on the control interface or the alarm system for example.

Other sensor may provide supplementary information to the processing system making it possible to specify the nature of the individual, animal or object or its location, in particular visual sensors using image recognition methods, for example. The processing system may determine if the individual, animal or object is approaching or moving away from the cable or cables by analyzing information coming from the control system of the cable and/or from various sensors, in particular capacitive and/or optical sensors.

The invention claimed is:

1. A method for detecting a change in the environment in the vicinity of at least an electrically-conductive portion of a lifting, traction or boundary cable, that change in the environment being linked to the relative movement of at least one individual, animal or object relative to said portion, the method including the step consisting in detecting a variation of the capacitance of said portion representative of said movement wherein:

said portion being raised to a predefined variable potential, the cable extending over at least a part of its length facing a screen raised to said predefined potential reducing the surface charge density of the cable portion situated facing this screen.

2. The method as claimed in claim 1, the cable being a lifting or traction cable, the change in the environment being linked to the coming into the proximity of said portion of the individual, animal or object, leading to a risk of collision with the latter and thus forming a potential obstacle.

3. The method as claimed in claim 1, wherein the screen extends at least partially around a system for guiding, driving and/or winding the cable enabling reduction or even elimination of the capacitive coupling of the cable with the guiding, driving and/or winding system.

4. The method as claimed in claim 1, wherein the screen is at least partially surrounded by a grounded shield.

5. The method as claimed in claim 1, said at least one portion extending as far as a distal end of the cable and/or consisting of the cable in its entirety and/or extending over a length less than that of the cable.

6. The method as claimed in claim 1, the cable including at least one core, said at least one electrically-conductive portion including at least one electrical conductor distinct from the core, and/or the cable including at least one core, said at least one electrically-conductive portion including at least one electrical conductor distinct from the core, said at least one electrical conductor including one or more electrical conductors.

7. The method as claimed in claim 1, the electrical conductors being covered with an electrical insulator.

8. A method for detecting a change in the environment in the vicinity of at least an electrically-conductive portion of a lifting, traction or boundary cable, that change in the environment being linked to the relative movement of at least one individual, animal or object relative to said portion, the method including the step consisting in detecting a variation of the capacitance of said portion representative of said movement, said portion being raised to a predefined variable potential, the cable including at least one electrical conductor supplying power to an element moved by the cable, said at least one electrical power supply conductor being surrounded by at least one screen raised to said predefined potential, said at least one conductive portion being situated outside that screen wherein a grounded shield surrounds the screen raised to the predefined potential, said at least one conductive portion being situated outside that shield.

9. The method as claimed in claim 1, the cable including at least one core to take up traction forces, a detection electrical conductor distinct from the core, and a signal transmission electrical conductor, the transmission electrical conductor being surrounded by a grounded shield, the core being situated around the shield and raised to the potential of the detection electrical conductor, the detection electrical conductor being situated around the core and an insulator surrounding the detection electrical conductor.

10. The method as claimed in claim 1, the cable including at least two successive portions electrically insulated from one another subjected simultaneously or sequentially to a predefined variable potential, in such a manner as to detect the possible presence in the proximity of each of them of said individual, animal or object and to be able to locate the individual, animal or object along the length of the cable and/or in which capacitive detection is effected on the one hand over all the length of the cable and on the other hand over at least a segment of the length of the cable, the position of which is known, better still over at least two successive segments of the length of the cable, the respective positions of which are known.

11. The method as claimed in claim 1, the variation of the capacitance being detected by measuring the current injected into said at least one portion and/or the cable being unwound from a winding and/or driving system, the variation of the capacitance of said at least one portion being detected with compensation of the variation of the electrical load induced by a modification of the unwound cable length and/or in which there are acquired both a quantity representing the variation of capacitance of said cable portion and a quantity representing movement of the cable, and/or the trend of the variation of the capacitance with time and/or as a function of the movement of the cable being compared to reference data.

12. A method for detecting a change in the environment in the vicinity of at least an electrically-conductive portion of a lifting, traction or boundary cable, that change in the environment being linked to the relative movement of at least one individual, animal or object relative to said portion, the method including the step consisting in detecting a variation of the capacitance of said portion representative of said movement, the variation of the capacitance being detected by measuring the current injected into said at least one portion and/or the cable being unwound from a winding and/or driving system, the variation of the capacitance of said at least one portion being detected with compensation of the variation of the electrical load induced by a modification of the unwound cable length and/or in which there are acquired both a quantity representing the variation of capacitance of said cable portion and a quantity representing movement of the cable, and/or the trend of the variation of the capacitance with time and/or as a function of the movement of the cable being compared to reference data, the method including the acquisition of reference data by causing the individual, animal or object to move in a predefined manner relative to the cable or including the acquisition of reference data by causing the cable and/or an element attached to the cable to effect a predefined movement.

13. The method as claimed in claim 1, including the step consisting in effecting at least one predefined action in the event of detection of the proximity of the individual, animal or object to said at least one portion of the cable, that action being in particular chosen from the generation of a visual, sound or tactile alert and stopping the movement of the cable and/or an element moved by the cable.

14. The method as claimed in claim 1, executed to detect a risk of collision between a human and at least some of the cables of a cable-driven parallel robot or to detect the approach to or the avoidance of a boundary cable by a human.

* * * * *